(12) United States Patent
Izumi

(10) Patent No.: US 8,818,189 B2
(45) Date of Patent: Aug. 26, 2014

(54) TRANSMISSION-PATH-TYPE SPECIFYING APPARATUS AND TRANSMISSION-PATH-TYPE SPECIFYING METHOD

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1141 days.

(21) Appl. No.: 12/314,918

(22) Filed: Dec. 18, 2008

(65) Prior Publication Data

US 2009/0297154 A1   Dec. 3, 2009

(30) Foreign Application Priority Data

May 27, 2008 (JP) ................................ 2008-138602

(51) Int. Cl.
| | |
|---|---|
| *H04B 10/08* | (2006.01) |
| *H04J 14/02* | (2006.01) |
| *H04B 10/079* | (2013.01) |
| *G01M 11/00* | (2006.01) |
| *H04B 10/00* | (2013.01) |

(52) U.S. Cl.
CPC ........ *H04B 10/0795* (2013.01); *H04J 14/0221* (2013.01); *G01M 11/332* (2013.01); *H04J 14/0212* (2013.01); *H04J 14/0201* (2013.01); *G01M 11/335* (2013.01); *H04J 14/0205* (2013.01); *H04J 14/0219* (2013.01)
USPC .................. 398/29; 398/28; 398/81; 398/147; 398/159

(58) Field of Classification Search
CPC ..................... H04B 10/07951; H04B 10/2513; H04B 10/2519; H04B 10/2525; H04B 10/25253; H04B 10/2531
USPC ........ 398/28, 29, 81, 147, 154, 159; 356/73.1
See application file for complete search history.

(56) References Cited

U.S. PATENT DOCUMENTS

| | | | |
|---|---|---|---|
| 2002/0159134 A1* | 10/2002 | Ghera et al. ................... | 359/334 |
| 2003/0071985 A1* | 4/2003 | Mori et al. .................... | 356/73.1 |

(Continued)

FOREIGN PATENT DOCUMENTS

| | | |
|---|---|---|
| JP | 2003-121303 | 4/2003 |
| JP | 2005-286906 | 10/2005 |
| JP | 2006-80770 | 3/2006 |
| JP | 2007-173969 | 7/2007 |

OTHER PUBLICATIONS

British Combined Search and Examination Report issued Mar. 18, 2009 in corresponding British Patent Application GB0900094.4.

(Continued)

*Primary Examiner* — Daniel Dobson
(74) *Attorney, Agent, or Firm* — Staas & Halsey LLP

(57) ABSTRACT

A transmission-path-type specifying apparatus includes an optical filter that extracts a plurality of different wavelength components from light including wavelength components occurring at the time of communication; an optical switch that simultaneously transmits same pulse signals superposed on light of the extracted wavelength components. The apparatus also includes an ASE modulation controlling unit that obtains a delay-time difference among the transmitted pulse signals when arriving at a destination via a transmission path; a characteristic-value calculating unit that calculates a characteristic value of the transmission path corresponding to a reference time varied depending on the obtained delay-time difference and a type of the transmission path; and a fiber-type determining unit that specifies the type of the transmission path based on the calculated characteristic value.

14 Claims, 25 Drawing Sheets

(56) References Cited

U.S. PATENT DOCUMENTS

2005/0226628 A1* 10/2005 Watanabe ............... 398/147
2006/0269284 A1* 11/2006 Fujita .................... 398/38
2008/0089695 A1* 4/2008 Ohtani ................... 398/147

OTHER PUBLICATIONS

Japanese Office Action mailed Jun. 12, 2012 issued in corresponding Japanese Patent Application No. 2008-138602.

* cited by examiner

FIG.4

| CHARA-CTERISTIC VALUE (V) | FIBER TYPE | OSC PROPAGATION SPEED (Vosc) | OUTPUT-POWER LIMIT VALUE (Pout) |
|---|---|---|---|
| v1 | FIBER 1 | x1 | p1 |
| v2 | FIBER 2 | x2 | p2 |
| v3 | FIBER 3 | x3 | p3 |
| v4 | FIBER 4 | x4 | p4 |
| v5 | FIBER 5 | x5 | p5 |
| v6 | FIBER 6 | x6 | p6 |
| v7 | FIBER 7 | x7 | p7 |
| v8 | FIBER 8 | x8 | p8 |

FIG.28

UNIT (ps/nm/km)

| TYPE OF OPTICAL FIBER | C-BAND | | | | | L-BAND | | | | |
|---|---|---|---|---|---|---|---|---|---|---|
| | WAVELENGTH | | | INCLI-NATION | OUTPUT POWER | WAVELENGTH | | | INCLI-NATION | OUTPUT POWER |
| | WAVE-LENGTH 1 (1528.77) | WAVE-LENGTH 2 (1545.72) | WAVE-LENGTH 3 (1563.45) | | | WAVE-LENGTH 1 (1570.42) | WAVE-LENGTH 2 (1587.88) | WAVE-LENGTH 3 (1607.04) | | |
| SMF | 15.82 | 16.798 | 17.797 | 0.057 | Pc1 | 18.15 | 19.09 | 20.12 | 0.054 | Pl1 |
| E-LEAF | 2.445 | 3.852 | 5.324 | 0.083 | Pc2 | 6.053 | 7.45 | 8.983 | 0.08 | Pl2 |
| Old-LEAF | 1.477 | 3.308 | 5.223 | 0.108 | Pc3 | 5.975 | 7.861 | 9.93 | 0.108 | Pl3 |
| TW-RS | 3.456 | 4.219 | 5.017 | 0.045 | Pc4 | 5.33 | 6.116 | 6.978 | 0.045 | Pl4 |
| TW-plus | 2.239 | 3.425 | 4.666 | 0.07 | Pc5 | 5.154 | 6.376 | 7.717 | 0.07 | Pl5 |
| TW Classic | 1.214 | 2.4 | 3.641 | 0.07 | Pc6 | 4.129 | 5.351 | 6.692 | 0.07 | Pl6 |
| LS | -2.754 | -1.517 | -0.223 | 0.073 | Pc7 | 0.287 | 1.562 | 2.96 | 0.073 | Pl7 |
| TeraLight | 6.769 | 7.752 | 8.78 | 0.058 | Pc8 | 9.184 | 10.197 | 11.308 | 0.058 | Pl8 |
| PureGUIDE | 6.726 | 7.743 | 8.807 | 0.06 | Pc9 | 9.225 | 10.273 | 11.422 | 0.06 | Pl9 |
| DSF | -1.507 | -0.299 | 0.923 | 0.07 | Pc10 | 1.388 | 2.54 | 3.805 | 0.066 | Pl10 |

TRANSMISSION-PATH-TYPE SPECIFYING APPARATUS AND TRANSMISSION-PATH-TYPE SPECIFYING METHOD

CROSS-REFERENCE TO RELATED APPLICATIONS

This application is based upon and claims the benefit of priority of the prior Japanese Patent Application No. 2008-138602, filed on May 27, 2008, the entire contents of which are incorporated herein by reference.

BACKGROUND

1. Field

The present invention relates to transmission-path-type specifying apparatuses and methods and, in particular, to a transmission-path-type specifying apparatus and method of specifying the type of a transmission path for transmitting an optical signal subjected to wavelength division multiplexing (WDM).

2. Description of the Related Art

In recent years, a communication technology has attracted attention in which a plurality of optical signals with different wavelengths are subjected to Wavelength Division Multiplexing (WDM) for transmission through an optical fiber. In a transmission using this WDM technique, regarding an optical pulse output to the optical fiber, when optical output power increases, an interference occurs due to a non-linear effect to distort a transmission waveform. For this reason, the maximum optical output power that can be output to the optical fiber is restricted. This maximum optical output value differs depending on the type of optical fiber. Thus, specifying the type of optical fiber is an extremely important factor in transmission using WDM.

Meanwhile, for transmission using WDM, a technology has been disclosed in which a transmitting apparatus of an optical transmission system outputs Amplified Spontaneous Emission (ASE) light, which is generated by supplying pumped light for amplifying an optical signal to an optical amplifier, to an optical fiber and then a receiving apparatus of the optical transmission system extracts from the output ASE light a plurality of different wavelengths to calculate a dispersion amount indicative of a propagation-delay-time difference among these wavelengths, thereby controlling a wavelength dispersion compensation amount so that the propagation delay time is 0 (refer to Japanese Patent Application Laid-open No. 2005-286906).

It is known that, by using this dispersion amount, the type of optical fiber is specified. In the following, by using FIGS. 27 and 28, a conventional method of specifying the type of an optical fiber is explained. FIG. 27 is a drawing of a conventional method of specifying the type of an optical fiber. In the method of specifying the type of an optical fiber depicted in FIG. 27, an Optical Time Domain Reflectometer (OTDR) is incorporated in an optical fiber. The OTDR outputs to the optical fiber a pulse superposed on light of two different types of wavelength ($\lambda 1$, $\lambda 2$), thereby measuring a dispersion amount (ps/nm/km) per unit length of the optical fiber with the use of a reflected pulse of the transmission pulse. Specifically, two laser diodes serving as wavelength light sources emit a pulse superposed by a pulse modulating unit onto pumped light of two different types of wavelength for amplification. Then, these two types of pulse pass through an optical coupler (CPL) and then an optical Consumer Infrared (CIR) for output to the optical fiber, as depicted in an upper-right portion of FIG. 27. Inside the optical fiber, a reflected pulse of the transmission pulse returns to the OTDR, as depicted in a lower-right portion of FIG. 27, with a waveform being attenuated due to part of the transmission pulse scattering in a direction reverse to a traveling direction. In the OTDR, the reflected pulse passes through the optical CIR to be demultiplexed at a wavelength filter, be converted by two photodiodes serving as receiving elements from an optical pulse to an electrical signal, and then be output to a level sampling unit. The level sampling unit measures a delay time (T) from the time when the transmission pulse is transmitted to the optical fiber to the time when it returns, an attenuation amount (X) corresponding to the delay time, and a loss factor ($\alpha$). Then, the level sampling unit calculates a length (L) of the optical fiber by using equations depicted in a lower right portion of FIG. 27 from the attenuation amount (X) and the loss factor ($\alpha$) to calculate a dispersion amount (D) per unit length of the optical fiber from the calculated length of the optical fiber and the delay time (T).

Here, dispersion characteristics of various optical fibers are explained by using FIG. 28. FIG. 28 depicts a dispersion amount (ps/nm/km) per unit length of the optical fiber, an inclination, and a maximum output power that can be output to the optical fiber, for each of types of optical fiber corresponding to a plurality of wavelengths that belong to a conventional band (C-BAND) and a long band (L-BAND), which are wavelength bands for WDM. In FIG. 28, the inclination represents a value obtained by dividing an increase in dispersion amount per unit length of the optical fiber by an increase in wavelength. A relation between the dispersion amount per unit length of the optical fiber and the wavelength shows linear approximation unique to the type of optical fiber found from the inclination for each type of optical fiber. Therefore, if the dispersion amount (D) per unit length of the optical fiber and an average wavelength between $\lambda 1$ and $\lambda 2$ are known, the optical fiber is specified with linear approximation unique to the type of optical fiber. Furthermore, maximum optical output power that can be output to the optical fiber is specified.

However, the method of specifying the type of an optical fiber explained above has a problem of high cost. That is, the OTDR includes at least two laser diodes serving as wavelength light sources and two photodiodes serving as receiving elements, which are generally expensive, resulting in high cost in the method of specifying the type of an optical fiber. In particular, specifying the type of optical fiber is performed only once at the time of start-up before operation of the optical transmission system and it is not rational to allow high cost for such a process as performed only once. Therefore, there is a need for specifying the type of optical fiber not at high cost.

Moreover, when dispersion amounts per unit length of a plurality of optical fibers are analogous to each other, the type of optical fiber cannot be specified even if the OTDR is used to specify the type of optical fiber.

Still further, in Japanese Patent Application Laid-open No. 2005-286906 mentioned above, the receiving apparatus of the optical transmission system calculates a dispersion amount, but does not calculate a length of the optical fiber. Therefore, the dispersion amount (D) per unit length of the optical fiber cannot be calculated from the dispersion amount, thereby making it impossible to specify the type of optical fiber. Therefore, even if this optical transmission system specifies the type of optical fiber by using the OTDR mentioned above, high cost is still required.

SUMMARY

It is an object of the present invention to at least partially solve the problems in the conventional technology.

According to an aspect of an embodiment, a transmission-path-type specifying apparatus includes an extracting unit that extracts a plurality of different wavelength components from light including wavelength components occurring at the time of communication; a transmitting unit that simultaneously transmits same pulse signals superposed on light of the wavelength components extracted by the extracting unit; an obtaining unit that obtains a delay-time difference among the pulse signals transmitted by the transmitting unit when arriving at a destination via a transmission path; a calculating unit that calculates a characteristic value of the transmission path corresponding to a reference time varied depending on the delay-time difference obtained by the obtaining unit and a type of the transmission path; and a specifying unit that specifies the type of the transmission path based on the characteristic value calculated by the calculating unit.

According to another aspect of an embodiment, a transmission-path-type specifying method includes extracting a plurality of different wavelength components from light including wavelength components occurring at the time of communication; simultaneously transmitting same pulse signals superposed on light of the extracted wavelength components; obtaining a delay-time difference among the transmitted pulse signals when arriving at a destination via a transmission path; calculating a characteristic value of the transmission path corresponding to a reference time varied depending on the delay-time difference obtained and a type of the transmission path; and specifying the type of the transmission path based on the calculated characteristic value.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 4 is a drawing of an example of a format of a fiber type table;

FIG. 28 is a drawing of dispersion characteristics of various optical fibers.

DETAILED DESCRIPTION OF THE PREFERRED EMBODIMENTS

Based on the drawings, embodiments of the transmission-path-type specifying apparatus and method according to the invention are explained in detail below. Note that the embodiments are not meant to restrict the present invention.

First Embodiment

Figure 1:
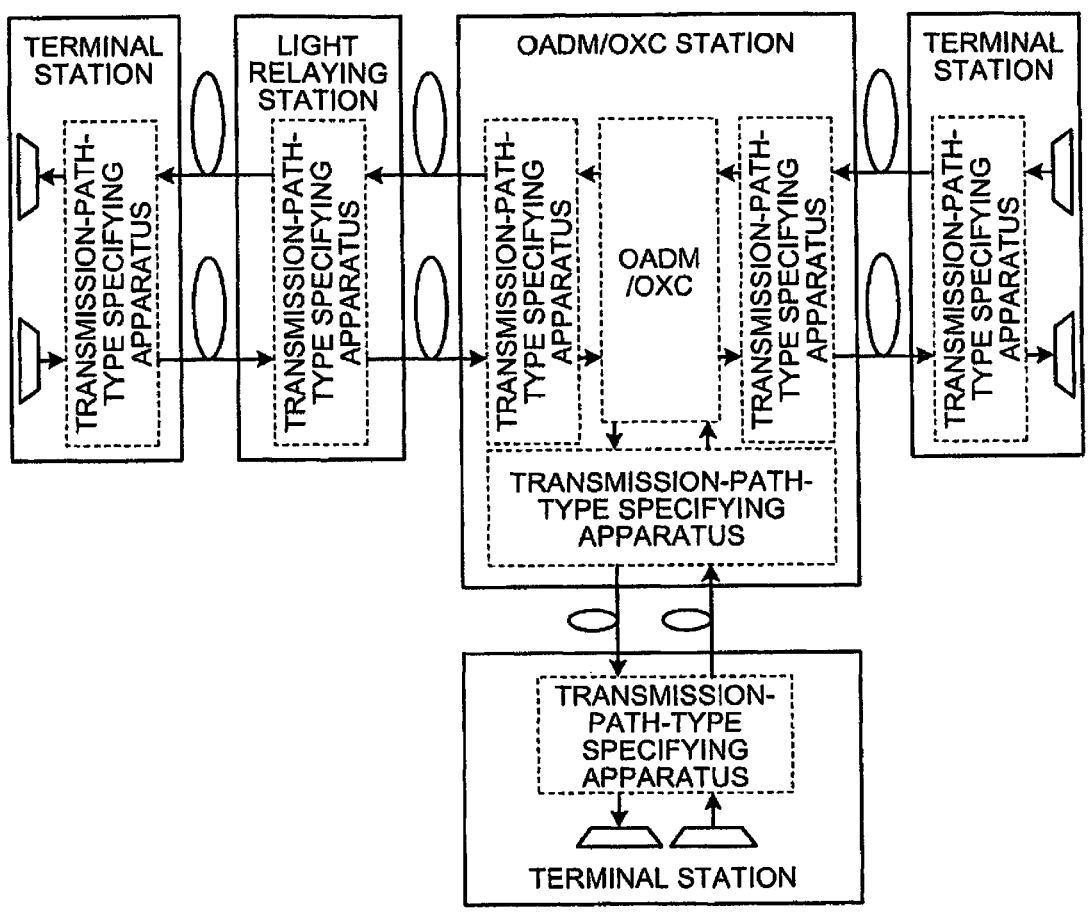
FIG. 1 is a drawing of an example of an entire configuration of an optical transmission system.

FIG. 1 is a drawing of an example of an entire configuration of an optical transmission system. As depicted in the drawing, the optical transmission system includes terminal stations, a light relaying station that relays an optical signal, an Optical Add Drop Multiplexer (OADM)/Optical Cross Connect (OXC) station including an OADM/OXC, which is a multiple branching device for multiple branching of the optical signal, and these stations are connected via an optical-fiber transmission path. At least one transmission-path-type specifying apparatus according to the present embodiment is provided to each station, specifying the type of an optical-fiber transmission path connecting its own apparatus and a transmission-path-type specifying apparatus of a transmission destination together. Description of this transmission-path-type specifying apparatus is explained in detail further below.

Figure 2:
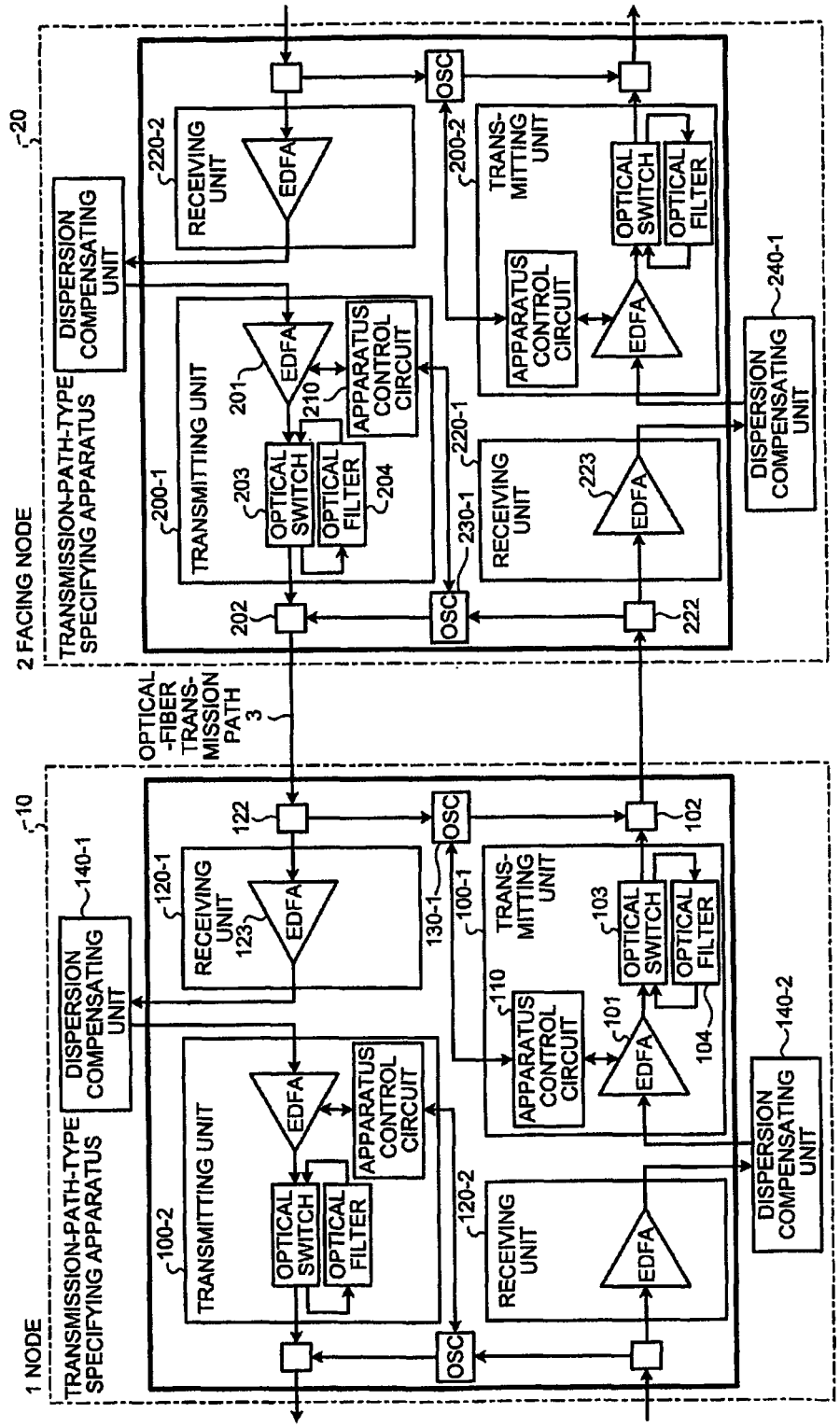
FIG. 2 is a drawing of the configuration of the optical transmission system.

Next, the configuration of the optical transmission system among transmission-path-type specifying apparatuses is explained by using FIG. 2. As depicted in the drawing, the optical transmission system has a node 1 and a facing node 2 that faces the node 1 connected to each other via an optical-fiber transmission path 3 serving as go and return paths. The node 1 includes a transmission-path-type specifying apparatus 10, which includes a transmitting unit 100-1 that transmits an optical signal to the facing node 2, a receiving unit 120-1 that receives the optical signal transmitted from the facing node 2, an Optical Supervisory Channel (OSC) 130-1, optical couplers 102 and 122, and a dispersion compensating unit 140-1. The transmitting unit 100-1 includes an Erbium-Doped Fiber Amplifier (EDFA) 101, an optical switch 103, an optical filter 104, and an apparatus control circuit 110. The receiving unit 120-1 includes an EDFA 123. The transmission-path-type specifying apparatus 10 includes a transmitting unit 100-2 that transmits the optical signal received at the receiving unit 120-1 to another facing node different from the facing node 2 and a receiving unit 120-2 that receives an optical signal transmitted from the facing node. Note that the following explanation is made mainly to each processing unit included in the node 1, and since the facing node 2 also includes processing units similar to those included in the node 1, the processing units of the facing node 2 are not explained herein. Also, the transmitting unit 100-2 and the receiving unit 120-2 of the node 1 are similar to the transmitting unit 100-1 and the receiving unit 120-1, and therefore are not explained herein.

The EDFA 101 is an erbium-doped optical fiber amplifier, generating ASE light with a gain bandwidth by pumping erbium ions with a pump laser. The EDFA 101 amplifies ASE light for intensity modulation, thereby generating an optical signal for each wavelength.

The optical coupler 102 outputs an optical signal output from the optical switch 103 to the optical-fiber transmission path 3. Also, the optical coupler 102 outputs an optical signal output from the OSC 130-1 to the optical-fiber transmission path 3.

The optical switch 103 is a switch that switches the path of the optical signal without converting the optical signal. At startup before operation of the optical transmission system, the optical switch 103 switches the route so that the ASE light generated by the EDFA 101 is output to the optical filter 104, and outputs the optical signal output from the optical filter 104 to the facing node 2. On the other hand, at the time of operation of the optical transmission system, the optical switch 103 switches the route so that the ASE light generated by the EDFA 101 is output to the facing node 2 without passing through the optical filter 104. Note herein that although the optical switch 103 is a 2×2 optical switch, it may be replaced by an 1×2 optical switch or a branching unit.

The optical filter 104 extracts light of two difference wavelength components from the ASE light passing through the optical switch 103, and then outputs optical signals of these extracted wavelength components to the optical switch 103. Note herein that, although the optical filter 104 extracts two different wavelength components from the ASE light, the optical filter 104 may extract three or more different wavelength components.

The apparatus control circuit 110 obtains from the OSC 130-1 a delay-time difference when the optical signals of two different wavelength components output from the optical filter 104 arrives at the facing node 2 via the optical-fiber transmission path 3. Also, the apparatus control circuit 110 obtains from the OSC 130-1 a time required for a measurement optical signal measured by the OSC 130-1 being transmitting through the optical-fiber transmission path 3 to go and return between the node 1 and the facing node 2. The apparatus control circuit 110 then divides the delay-time difference by the time required for going and returning to calculate a characteristic value of the optical fiber in the optical-fiber transmission path 3. The apparatus control circuit 110 then specifies the type of the optical-fiber transmission path 3 from the calculated characteristic value. Note that the wavelength for use in the measurement optical signal is different from wavelength components extracted by the optical filter 104, and is a recommended wavelength fixedly defined in, for example, International Telecommunication Union Telecommunication Standardization Sector (ITU-T).

The optical coupler 122 branches the optical signal obtained from the optical-fiber transmission path 3 into the OSC 130-1 and the EDFA 123.

The EDFA 123 is an erbium-doped optical fiber amplifier, amplifying the optical signal branched from the optical coupler 122 by pumping erbium ions with a pump laser.

The OSC 130-1 is an optical monitoring device that allows information exchanges between the node 1 and the facing node 2 via the optical coupler 102 and the optical coupler 122. Specifically, the OSC 130-1 obtains via the optical coupler 122 a delay-time difference when the optical signals of two wavelength components output from the optical filter 104 arrives at the facing node 2 via the optical-fiber transmission path 3, and then outputs the delay-time difference to the apparatus control circuit 110. Also, the OSC 130-1 obtains via the optical coupler 122 the time required for the measurement optical signal of a wavelength different from these two wavelength components mentioned above to be output to the optical coupler 102 and return via the facing node 2, and then outputs the time to the apparatus control circuit 110.

The dispersion compensating unit 140-1 compensates for wavelength dispersion of the optical signal being transmitted through the optical-fiber transmission path 3. For example, the dispersion compensating unit 140-1 finds an inclination of a dispersion amount uniquely identified from the type of the optical-fiber transmission path 3 specified by the apparatus control circuit 110 to compensate for a dispersion amount to be corrected for the wavelength of the optical signal being transmitted through the optical-fiber transmission path 3. Note that a dispersion compensating unit 140-2 is similar to the dispersion compensating unit 140-1, and therefore is not explained herein.

Figure 3:
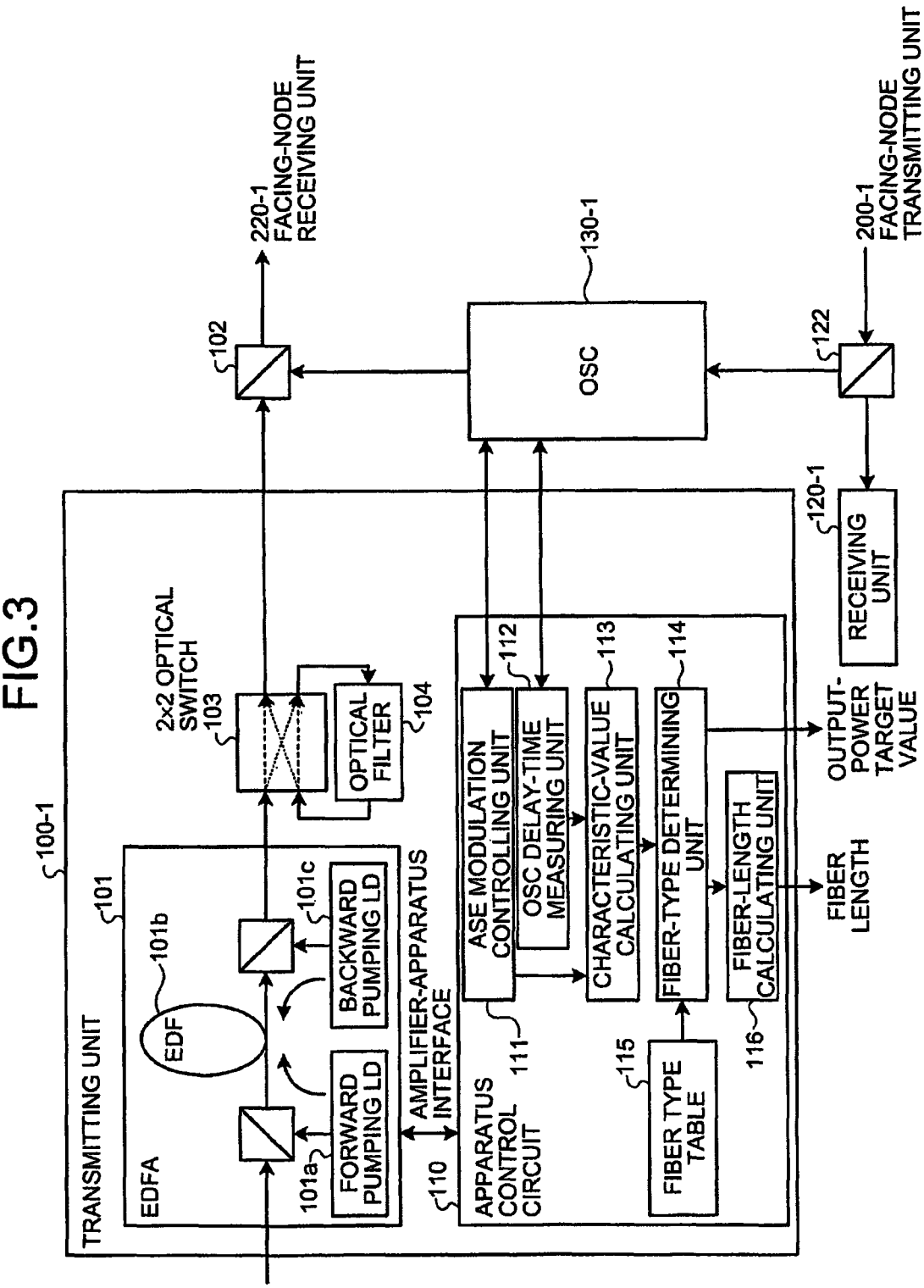
FIG. 3 is a functional block diagram depicting the configuration of a transmitting unit of a transmission-path-type specifying apparatus according to a first embodiment.

FIG. 3 is a functional block diagram depicting the detailed configuration of the transmitting unit of the transmission-path-type specifying apparatus according to the first embodiment. As depicted in the drawing, the transmitting unit 100-1 of the transmission-path-type specifying apparatus 10 includes the EDFA 101, the 2×2 optical switch 103, the optical filter 104, and the apparatus control circuit 110.

The EDFA 101 uses both a forward pumping laser diode (LD) 101a and a backward pumping LD 101c in an Erbium-Doped Fiber (EDF) 101b to pump erbium ions to generate ASE light. The EDF 101b is an optical fiber for use in the EDFA 101. The EDFA 101 amplifies ASE light for intensity modulation. Here, the forward pumping LD 101a is a laser diode for transmission of pump light and an external optical signal in the same direction, whilst the backward pumping LD 101c is a laser diode for transmission in a reverse direction. When the EDFA 101 amplifies an externally-input optical signal together with ASE light, the output level of the ASE light is changed, thereby influences measurement of a delay-time difference between two wavelength components extracted from the ASE light. To prevent such influences, the transmitting unit 100-1 preferably cuts off an input of an external optical signal. For example, an input of an external optical signal may be cut off by providing the transmitting unit 100-1 with a Variable Optical Attenuator (VOA) or an optical switch before an optical signal is input to the EDFA 101.

The 2×2 optical switch 103 is a crossbar switch of a 2×2 structure, and is capable of changing the traveling direction of the optical signal by being switched to a bar operation or a cross operation. That is, the 2×2 optical switch 103 is switched to a cross operation at the time of startup before the optical transmission system is operated, outputting the ASE light generated by the EDFA 101 to the optical filter 104. On the other hand, the 2×2 optical switch 103 is switched to a bar operation when the optical transmission system is operated, outputting the ASE light generated by the EDFA 101 to a receiving unit 220-1 of the facing node 2. With this, the transmission-path-type specifying apparatus 10 can use the EDFA 101 used at the time of operation of the optical transmission system also at the time of specifying the type of the optical-fiber transmission path 3 at the time of startup optical transmission system, thereby reducing the EDFA 101 and cost.

The optical filter 104 extracts light of two different wavelength components from the ASE light passing through the optical switch 103, and then outputs optical signals of the extracted wavelength components to the receiving unit 220-1 of the facing node through the optical-fiber transmission path 3.

The apparatus control circuit 110 includes an ASE modulation controlling unit 111, an OSC delay-time measuring unit 112, a characteristic-value calculating unit 113, a fiber-type determining unit 114, a fiber type table 115, and a fiber-length calculating unit 116. The ASE modulation controlling unit 111 modulates the intensity of laser light of the forward pumping LD 101a and the backward pumping LD 101c with respect to the EDFA 101. Also, the ASE modulation controlling unit 111 outputs a request for measuring a delay-time difference to the OSC 130-1 so that a delay-time difference between the optical signals superposed on the two wavelength components transmitted through the optical-fiber transmission path 3 is measured by the facing node 2. Then, the ASE modulation controlling unit 111 obtains the delay-time difference measured by the facing node 2 from the OSC 130-1.

The OSC delay-time measuring unit 112 measures a delay time from the time when the measurement optical signal output from the OSC 130-1 goes via the optical-fiber transmission path 3 and to the time when the measurement optical signal returns from the facing node 2 to the OSC 130-1.

The characteristic-value calculating unit 113 divides the delay-time difference obtained by the ASE modulation controlling unit 111 by the delay time measured by the OSC delay-time measuring unit 112 to calculate a characteristic value of the optical fiber in the optical-fiber transmission path 3. Here, the characteristic value of the optical fiber in the optical-fiber transmission path 3 is unique to the type of the optical-fiber transmission path 3, because two wavelength components extracted by the optical filter 104 and the wavelength of the measurement optical signal are transmitted through the same distance section in the optical-fiber transmission path 3 connecting the transmitting unit 100-1 and the facing-node receiving unit 220-1 and the delay time due to transmission of the measurement optical signal represents a reference time varied for each type of optical fiber. That is, the speed of each wavelength is varied depending on the type of optical fiber, and therefore the characteristic value of the optical fiber is unique to the type of the optical-fiber transmission path 3.

The fiber-type determining unit 114 specifies from the fiber type table 115 the fiber type of the optical-fiber transmission path 3 by taking the characteristic value calculated by the characteristic-value calculating unit 113 as a key. At this time, the fiber-type determining unit 114 specifies from the fiber type table 115 an output-power limit value corresponding to the specified fiber type. Then, the fiber-type determining unit 114 calculates an appropriate output-power target value from the output-power limit value, and then outputs the calculation result.

The fiber type table 115 retains, in advance, information about a fiber type of the optical-fiber transmission path and a characteristic value of the optical fiber in the optical-fiber transmission path as a pair. With reference to FIG. 4, a data structure retained in the fiber type table 115 is now explained. As depicted in the drawing, the fiber type table 115 retains, for each type of the optical-fiber transmission path, a characteristic value of the optical fiber, a propagation speed of the measurement optical signal output from the OSC 130-1 in the optical-fiber transmission path, and an output-power limit value of the optical signal output to the optical-fiber transmission path.

The fiber-length calculating unit 116 calculates the length of the optical-fiber transmission path 3 based on the fiber type specified by the fiber-type determining unit 114. Specifically, the fiber-length calculating unit 116 specifies an OSC propagation speed from the fiber type table 115 by taking the fiber type as a key, and calculates a value by multiplying the specified OSC propagation speed by the delay time measured by the OSC delay-time measuring unit 112 and then dividing the multiplication result by 2. The reason for dividing the multiplication result by 2 is that the delay time measured by the OSC delay-time measuring unit 112 is a propagation time for going and returning through the optical-fiber transmission path 3. With this, the fiber-length calculating unit 116 can easily calculates the length of the optical-fiber transmission path 3. The fiber-length calculating unit 116 then causes the calculated length of the optical-fiber transmission path 3 to be displayed on a monitor, for example.

Figure 5:
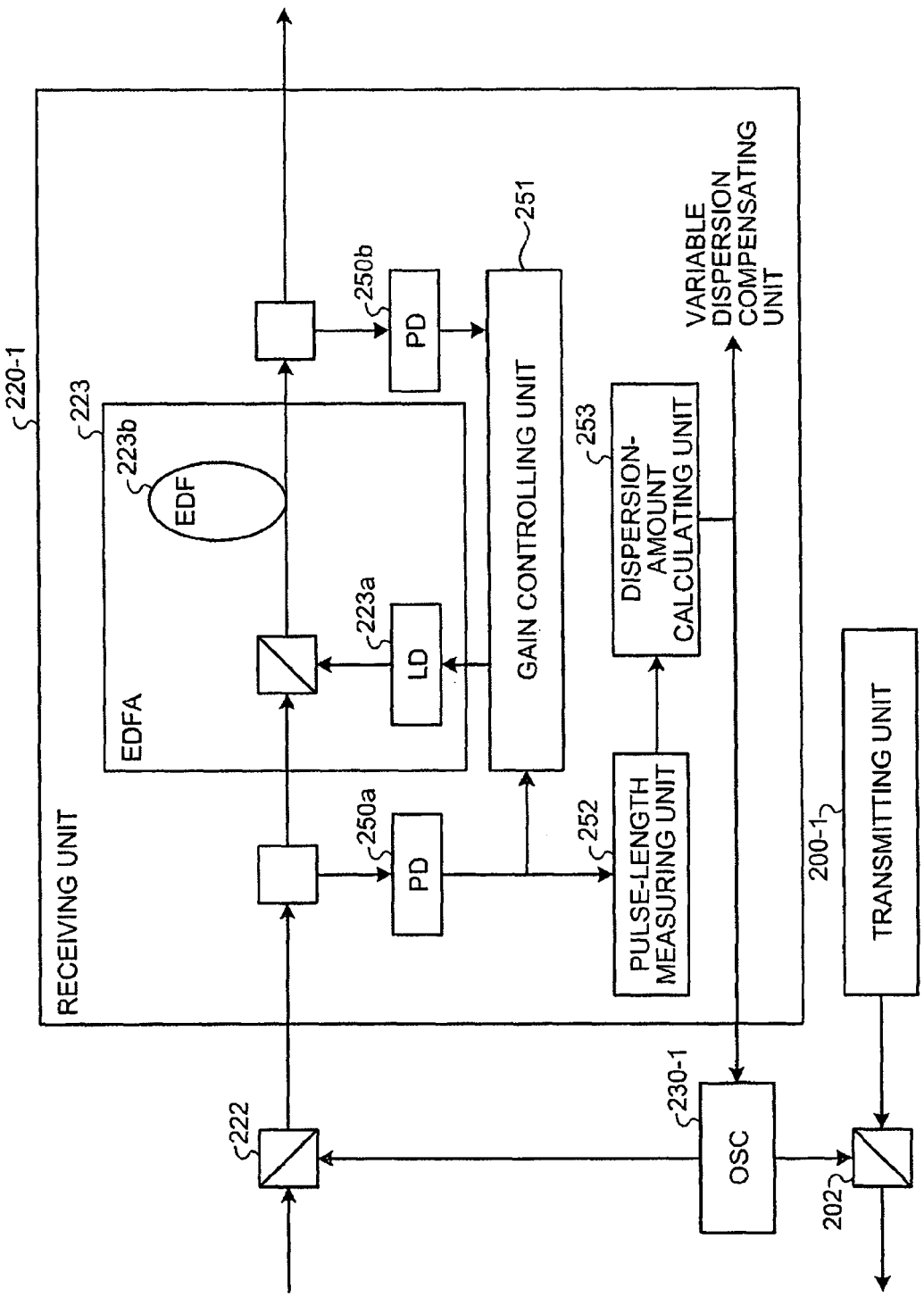
FIG. 5 is a functional block diagram depicting the configuration of a receiving unit of the transmission-path-type specifying apparatus according to the first embodiment.
Figure 6:
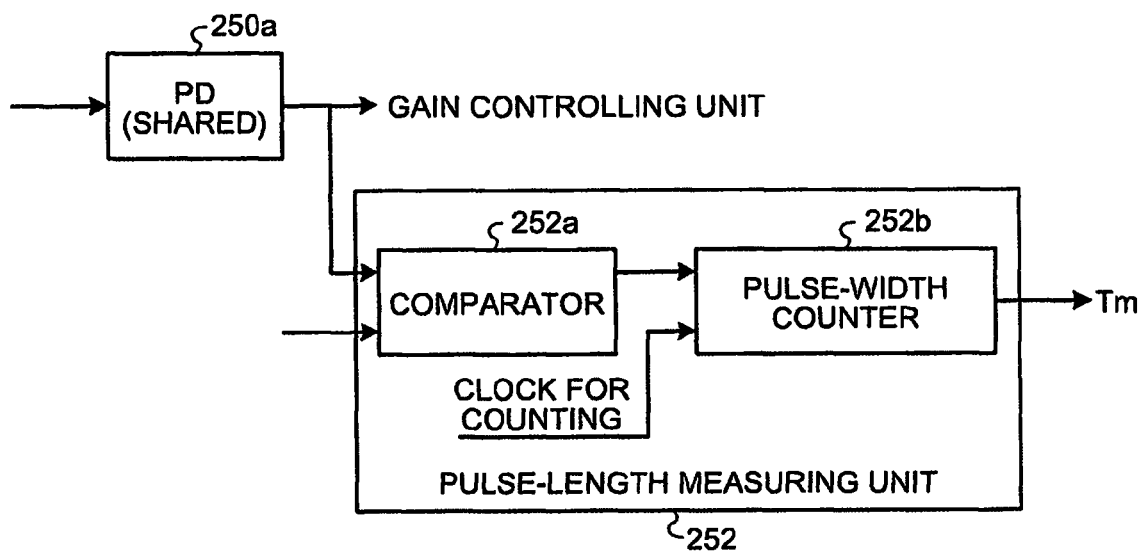
FIG. 6 is a functional block diagram depicting the configuration of a detection circuit in a pulse-length measuring unit.

Next, the configuration of the receiving unit of the transmission-path-type specifying apparatus according to the first embodiment is explained by using FIGS. 5 and 6, which are functional block diagrams thereof. FIG. 5 is a functional block diagram depicting the configuration of the receiving unit of the transmission-path-type specifying apparatus according to the first embodiment. As depicted in the drawing, the receiving unit 220-1 of a transmission-path-type specifying apparatus 20 includes photodiodes (PDs) 250a and 250b, an EDFA 223, a gain controlling unit 251, a pulse-length measuring unit 252, and a dispersion-amount calculating unit 253. Here, the case is explained in which an optical signal output from the transmitting unit 100-1 of the node 1 is received by the receiving unit 220-1 of the facing node 2.

The PD 250a generates a current corresponding to a light intensity of an optical signal. That is, optical signals of two different wavelength components output from the transmitting unit 100-1 of the node 1 are converted by the single PD 250a to an analog signal. Then, the PD 250a outputs the analog signal to the pulse-length measuring unit 252 so that a delay-time difference between these optical signals of two different wavelength components is measured, and also outputs to the gain controlling unit 251 them so that an amplification gain of the EDFA 223 is controlled. Note that the PD 250a is also used in the receiving unit 220-1 to control the gain of the EDFA 223 at the time of operation of the optical transmission system.

The gain controlling unit 251 controls an amplification gain based on the optical signal output from the node 1 and the optical signal obtained by amplifying the optical signal output from the node 1 by the EDFA 223.

The pulse-length measuring unit 252 measures a pulse length based on the waveform of the analog signal obtained through conversion by the PD 250a. Here, the pulse-length measuring unit 252 may output the measured pulse length to an OSC 230-1 to allow the transmitting unit 100-1 of the node 1 to calculate a dispersion amount.

The dispersion-amount calculating unit 253 calculates a delay-time difference between the optical signals of two different wavelength components output from the transmitting unit 100-1 of the node 1 based on the pulse length measured by the pulse-length measuring unit 252. Specifically, dispersion-amount calculating unit 253 obtains in advance from the OSC 130-1 of the node 1 a modulation condition for ASE light (a pulse width with light lit on), and then subtracts the pulse width from the pulse length measured by the pulse-length measuring unit 252 to calculate a delay-time difference (T). The dispersion-amount calculating unit 253 then outputs the calculated delay-time difference to the OSC 230-1. Also, the dispersion-amount calculating unit 253 uses the calculated delay-time difference to calculate a dispersion amount $Z(\lambda c)$(ps/nm) for an average wavelength $\lambda c$ of two wavelengths $\lambda 1$ and $\lambda 2$ by using the following equation:

$$\lambda c=(\lambda 2+\lambda 1)/2$$

$$Z(\lambda c)=T/(\lambda 2-\lambda 1)(\text{where } \lambda 2>\lambda 1) \quad (1)$$

The dispersion-amount calculating unit 253 then outputs the calculated dispersion amount to the OSC 230-1 and a variable dispersion compensating unit, which will be explained further below.

The EDFA 223 includes an LD 223a and an EDF 223b. Here, the LD 223a and the EDF 223b are similar to the forward pumping LD 101a and the EDF 101b, respectively, and therefore are not explained herein. Here, in consideration of the case in which the waveform of the optical signal output from the transmitting unit 100-1 of the node 1 is distorted in the optical-fiber transmission path 3 due to a non-linear effect, an EDFA may be provided at an entrance of the receiving unit 220-1.

FIG. 6 is a functional block diagram depicting the configuration of a detection circuit in the pulse-length measuring unit 252 connected to one PD. As depicted in the drawing, the pulse-length measuring unit 252 includes a comparator 252a and a pulse-width counter 252b, and is connected to the PD 250a.

The comparator 252a compares a voltage of the analog signal obtained through PD 250a conversion of the optical signals of two different wavelength components output from the transmitting unit 100-1 of the node 1 and a reference voltage.

When the comparator 252a determines that the voltage of the analog signal is larger than the reference voltage, the pulse-width counter 252b uses a clock for counting to count the number of clocks, and then outputs a counted value (pulse length: Tm).

Figure 7:
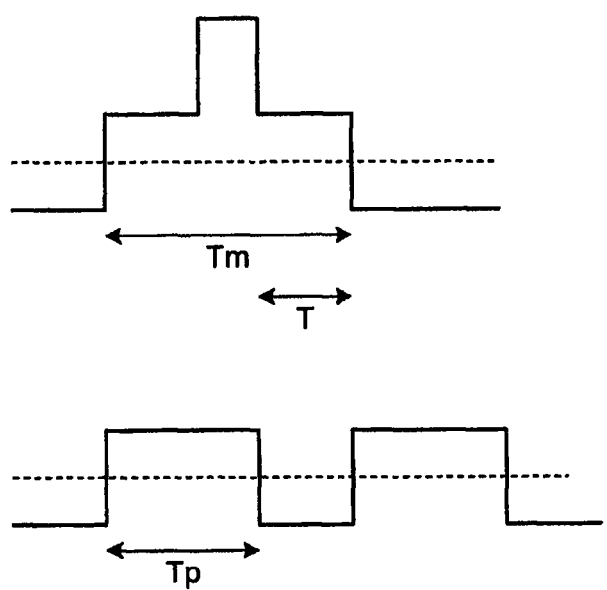
FIG. 7 is a drawing of a wavelength of a delay-time difference measured by using a single shared photodiode (PD)

FIG. 7 is a drawing of a waveform of a delay-time difference measured by using a detection circuit in the pulse-length measuring unit 252 connected to a single PD. As depicted in the drawing, the pulse length from rising to trailing of the analog waveform converted by the shared PD 250a corresponds to Tm measured by the pulse-width counter 252b. The dispersion-amount calculating unit 253 obtains a pulse width Tp from the OSC 130-1 of the node 1, and a value obtained by subtracting Tp from Tm is a delay-time difference (T).

Figure 8:
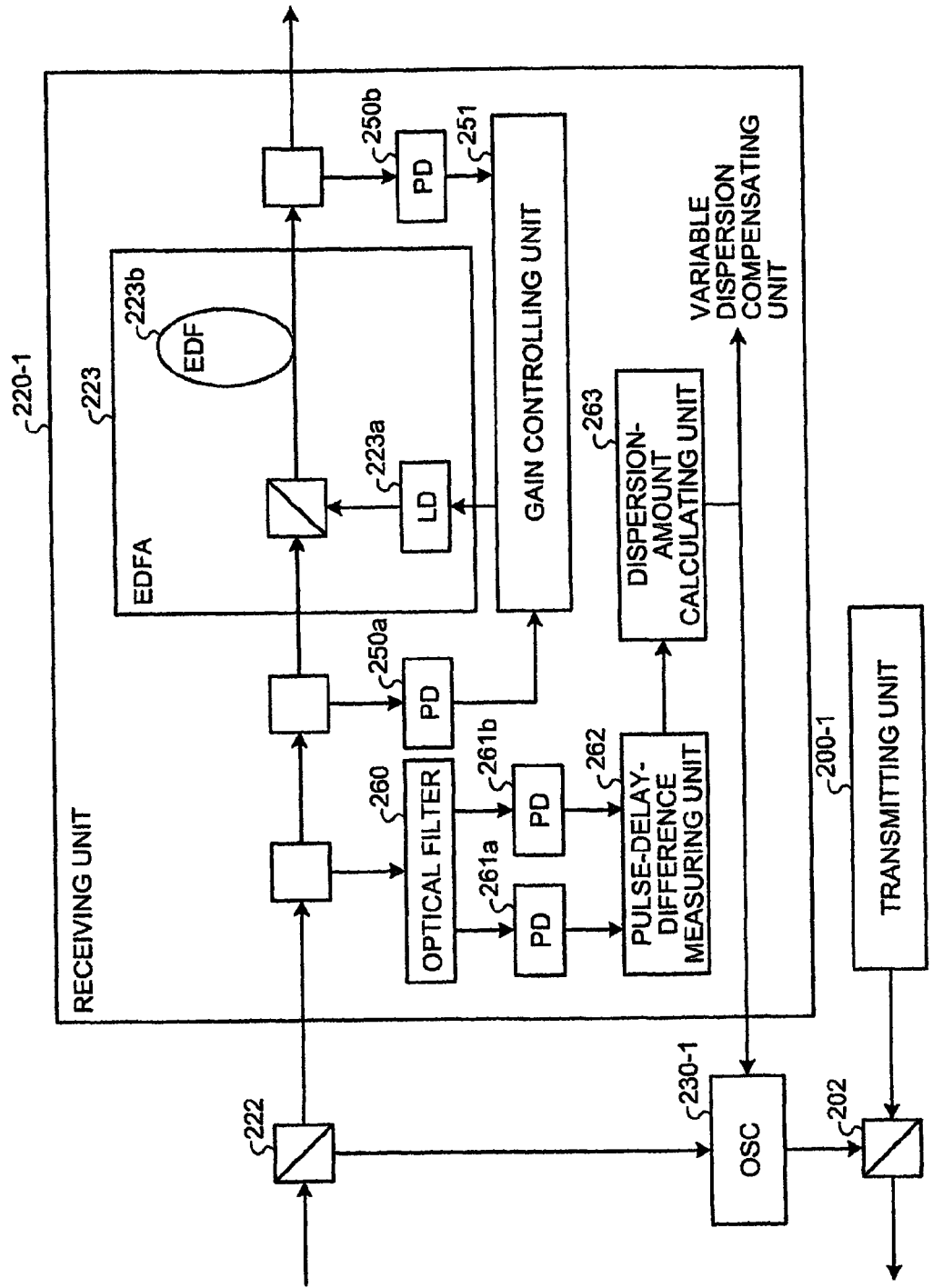
FIG. 8 is a functional block diagram depicting a modification example of the configuration of the receiving unit of the transmission-path-type specifying apparatus according to the first embodiment.

With this, the receiving unit 220-1 can use the PD 250a used at the time of operation of the optical transmission system also for measuring a delay-time difference of the optical signals at the time of startup of the optical transmission system, thereby reducing the PD and cost. Next, a modification example of the configuration of the receiving unit of the transmission-path-type specifying apparatus according to the first embodiment is explained by using FIGS. 8 and 9, which are functional block diagrams thereof. FIG. 8 is a functional block diagram depicting the modification example of the configuration of the receiving unit of the transmission-path-type specifying apparatus according to the first embodiment. As depicted in the drawing, the modification example of the configuration of the receiving unit 220-1 of the transmission-path-type specifying apparatus 20 is different from the configuration of the receiving unit 220-1 of the transmission-path-type specifying apparatus 20 in FIG. 5 in that two PDs (261a and 261b) are provided, and therefore an optical filter 260, a pulse-delay-difference measuring unit 262, and a dispersion-amount calculating unit 263 are provided. Functions other than the optical filter 260, the two PDs 261a and 261b, the pulse-delay-difference measuring unit 262, and the dispersion-amount calculating unit 263 are similar to those in FIG. 5, and therefore are not explained herein.

The optical filter 260 separates the optical signals of two different wavelength components output from the transmitting unit 100-1 of the node 1 by wavelength.

The PDs 261a and 261b generate a current corresponding to the light intensity of the optical signal separated by the optical filter 260 by wavelength, thereby converting the optical signals to analog signals.

The pulse-delay-difference measuring unit 262 measures a delay-time difference based on the waveform of the analog signals obtained through conversion by the PD 261a and PD 261b.

The dispersion-amount calculating unit 263 uses the measured delay-time difference to calculate a dispersion amount of an average wavelength between two wavelengths. Specifically, the dispersion-amount calculating unit 263 divides the delay-time difference by a difference between these two different wavelengths to calculate a dispersion amount of the average wavelength of these two wavelengths.

Figure 9:
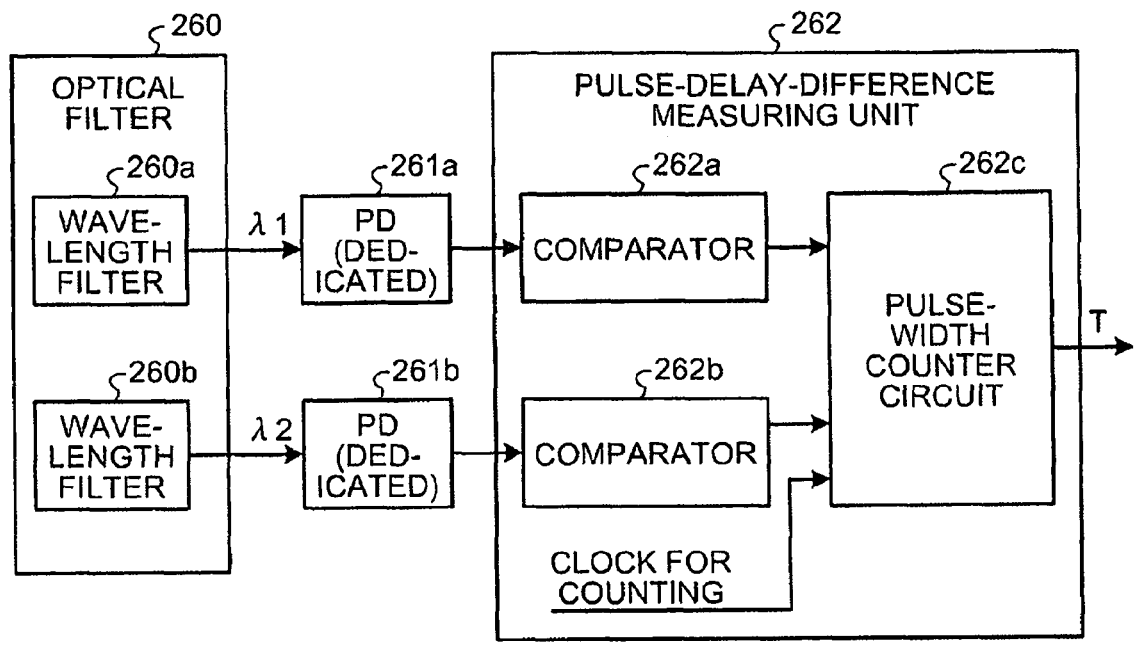
FIG. 9 is a functional block diagram depicting the configuration of a detection circuit in a pulse-delay-difference measuring unit.

FIG. 9 is a functional block diagram depicting the configuration of a detection circuit in the pulse-delay-difference measuring unit 262 connected to two PDs. As depicted in the drawing, the pulse-delay-difference measuring unit 262 includes two comparators 262a and 262b and a pulse-width counter circuit 262c, the comparator 262a being connected to a PD 261a and the comparator 262b being connected to a PD 261b, the PDs 261a and 261b being connected to the optical filter 260. Note that the PDs 261a and 261b are not shared with the PD 250a for use to controlling the gain of the EDFA 223, but are dedicatedly used to measure a delay-time difference between the optical signals.

The optical filter 260 separates, by wavelength, the optical signals of two different wavelength components output from the transmitting unit 100-1 of the node 1 by using wavelength filters 260a and 260b, and then outputs the result. Then, for example, the PD 261a converts the signal of the wavelength component $\lambda 1$ output from the wavelength filter 260a to an analog signal for output. Also, the PD 261b converts the signal of the wavelength component λ2 output from the wavelength filter 260b to an analog signal for output.

The comparator 262a compares the voltage of the analog signal of the wavelength component (λ1) output from the PD 261a and the reference voltage, and notifies the pulse-width counter circuit 262c of a point in time when the voltage of the analog signal of the wavelength component (λ1) becomes larger than the reference voltage. Also, the comparator 262b compares the voltage of the analog signal of the wavelength component (λ2) output from the PD 261b and the reference voltage, and notifies the pulse-width counter circuit 262c of a point in time when the voltage of the analog signal of the wavelength component (λ2) becomes larger than the reference voltage.

The pulse-width counter circuit 262c uses a clock for counting to count the pulse width from the time when one of the comparators 262a and 262b notified first to the time when the other of them notified later, and then outputs the counted value (delay-time difference: T)

Figure 10:
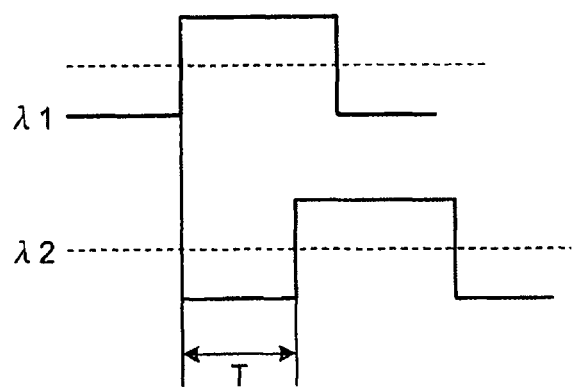
FIG. 10 is a drawing of a waveform of a delay-time difference measured by using two dedicated PDs.

FIG. 10 is a drawing of a waveform of a delay-time difference measured by using two dedicated PDs. The pulse-width counter circuit 262c uses the clock to count a difference between the time of rising of the analog waveform of the wavelength component λ1 obtained through conversion by the dedicated PD 261a and the time of rising of the analog waveform of the wavelength component λ2 obtained through conversion by the dedicated PD 261b to measure the delay-time difference T.

With this, the receiving unit 220-1 separates the optical signals of two different waveform components. Thus, a time difference in rising of each waveform corresponds to a delay-time difference. Therefore, the delay-time difference between the optical signals of two different waveform components can be easily measured.

Figure 11:
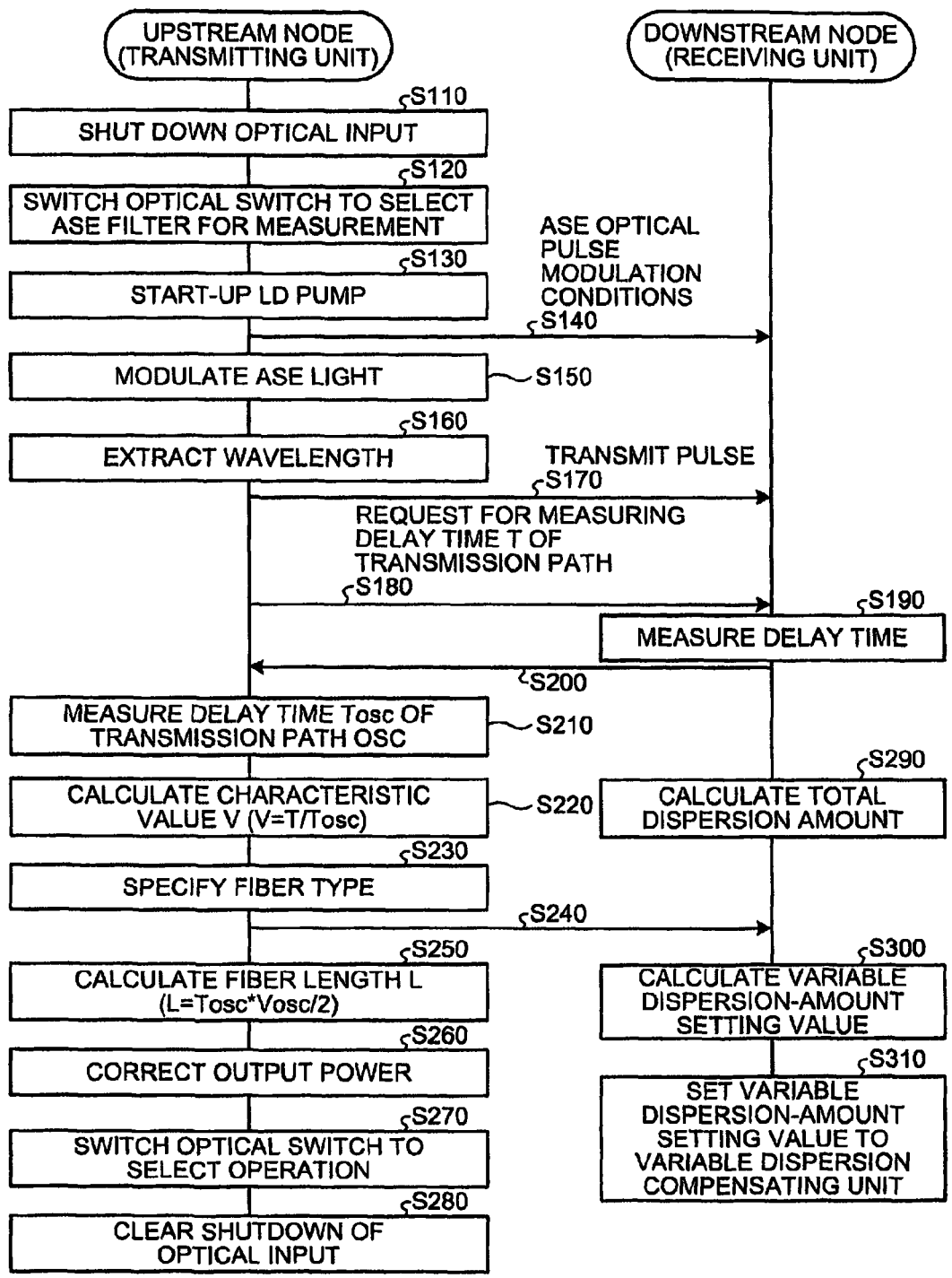
FIG. 11 is a sequence diagram depicting a general outline of a process of the optical transmission system.

Next, with reference to FIG. 11, general outline of the process of the optical transmission system according to the first embodiment is explained.

First, in an upper node (transmitting unit), the transmitting unit 100-1 cuts off an external optical signal for the EDFA 101 when, for example, a start command for specifying the type of transmission path is accepted from a monitor. For example, an instruction for cutting off an optical signal is output to a VOA, if provided. The VOA accepting this cut-off instruction shuts down any external optical signal (S110).

The transmitting unit 100-1 accepting the start command outputs to the 2×2 optical switch 103 an instruction for switching to a cross operation. The 2×2 optical switch 103 accepting this switching instruction is switched to select a cross operation so that the optical signal is input to the optical filter 104 (S120).

Furthermore, the transmitting unit 100-1 accepting the start command outputs to the EDFA 101 an instruction for starting the EDFA. The EDFA 101 accepting this starting instruction starts the pumps of the forward pumping LD 101a and the backward pumping LD 101c (S130).

Next, the transmitting unit 100-1 outputs to the ASE modulation controlling unit 111 a control instruction for modulating the ASE light. The ASE modulation controlling unit 111 accepting this control instruction first notifies the OSC 130-1 of a modulation condition for the ASE light. The OSC 130-1 then outputs to the downstream node 2 the modulation condition for the ASE light (S140). Here, the modulation condition for the ASE light includes a pulse width (Tp) with the ASE light lit on and a period (Th) from trailing to rising of the pulse. Next, the ASE modulation controlling unit 111 instructs the EDFA 101 for intensity modulation.

The EDFA 101 instructed for intensity modulation modulates the ASE light by modulating the intensity of laser light from the forward pumping LD 101a and the backward pumping LD 101c (S150).

The ASE light modulated by the EDFA 101 then passes through the 2×2 optical switch 103 to be input to the optical filter 104. The optical filter 104 then extracts optical signals of two different wavelength components from the input ASE light (S160). The optical filter 104 then outputs the extracted optical signals of two different wavelength components to the downstream node 2 (S170).

Subsequently, the ASE modulation controlling unit 111 outputs to the OSC 130-1 a request for measuring the delay-time difference (T) between the optical signals of two wavelength components output from the optical filter 104 when they arrive at the downstream node 2 via the optical-fiber transmission path 3. The OSC 130-1 then outputs a request for measuring the delay-time difference (T) to the downstream node 2 (S180).

On the other hand, in the receiving unit 220-1 of the downstream node (the receiving unit), the pulse-length measuring unit 252 obtains the request for measuring the delay-time difference T output from the OSC 130-1. The pulse-length measuring unit 252 then measures a pulse length (Tm) of waveforms of the optical signals of two wavelength components transmitted through the optical-fiber transmission path 3. The dispersion-amount calculating unit 253 then calculates the delay-time difference (T) by subtracting the pulse width (Tp) with the ASE light lit on from the pulse length (Tm) measured by the pulse-length measuring unit 252 (S190).

The dispersion-amount calculating unit 253 then outputs the measured delay-time difference (T) to the OSC 230-1. The OSC 230-1 then outputs the delay-time difference (T) to the upstream node 1 (S200).

Returning to the upstream node (transmitting unit), the ASE modulation controlling unit 111 obtains the delay-time difference (T) from the OSC 130-1 obtaining the delay-time difference (T) output from the OSC 230-1.

Subsequently, the OSC delay-time measuring unit 112 outputs to the OSC 130-1 a request for measuring a delay time (Tosc) of the optical-fiber transmission path 3 using a measurement optical signal. The OSC delay-time measuring unit 112 then obtains a response notification from the OSC 130-1, and measures a delay time from the output of the measurement request to obtainment of the response notification (S210).

The characteristic-value calculating unit 113 then divides the delay-time difference (T) obtained by the ASE modulation controlling unit 111 by the delay time (Tosc) measured by the OSC delay-time measuring unit 112 to calculate a characteristic value (V) of the optical fiber in the optical-fiber transmission path 3 (S220).

The fiber-type determining unit 114 then specifies the fiber type based on the characteristic value calculated by the characteristic-value calculating unit 113 (S230). Specifically, the fiber-type determining unit 114 obtains a fiber type from the fiber type table 115 by taking the characteristic value as a key. At this time, the fiber-type determining unit 114 obtains from the fiber type table 115 an OSC propagation speed and an output-power limit value corresponding to the obtained fiber type. The fiber-type determining unit 114 then outputs the output-power limit value to the monitor, for example.

Also, the fiber-type determining unit 114 outputs the specified fiber type to the OSC 130-1. The OSC 130-1 then outputs the fiber type output from the fiber-type determining unit 114 to the downstream node 2 (S240). The fiber-type determining unit 114 then transmits to the transmitting unit 100-1 a notification indicative of completion of specifying the fiber type of the optical-fiber transmission path 3.

On the other hand, the transmitting unit 100-1 accepting the notification indicative of completion of specifying the fiber type outputs to the fiber-length calculating unit 116 an instruction for calculating a fiber length. The fiber-length calculating unit 116 accepting this instruction for calculation multiplies the delay time (Tosc) of the optical-fiber transmission path 3 measured by the OSC delay-time measuring unit 112 by the OSC propagation speed obtained by the fiber-type determining unit 114. Since the delay time (Tosc) of the optical-fiber transmission path 3 corresponds to a propagation time for going and returning through the optical-fiber transmission path 3, the fiber-length calculating unit 116 divides the multiplication result by 2 to calculate the fiber length L (S250). The fiber-length calculating unit 116 then outputs to the calculated fiber length to the monitor, for example.

Also, the transmitting unit 100-1 accepting the notification indicative of completion of specifying the fiber type corrects output power based on the output-power limit value obtained by the fiber-type determining unit 114 (S260).

Furthermore, the transmitting unit 100-1 outputs to the 2×2 optical switch 103 an instruction for switching to a bar operation so that transmission-path-type specifying apparatus 10 is operated as an optical transmission system. The 2×2 optical switch 103 accepting this switching instruction is switched to select a bar operation (S270).

The transmitting unit 100-1 then outputs an instruction for clearing shutdown of an optical signal to, for example, a VOA, which shuts down an external optical signal, if provided at EDFA 101. The VOA accepting this shutdown clearing instruction clears shutdown of an external optical signal (S280).

On the other hand, in the downstream node (receiving unit), the dispersion-amount calculating unit 253 calculates a dispersion amount based on the measured delay-time difference (T) (S290).

Also, a variable dispersion compensating unit 270 calculates a variable-dispersion-amount setting value based on the dispersion amount calculated by the dispersion-amount calculating unit 263 and the fiber type output from the OSC 130-1 (S300). The variable dispersion compensating unit 270 sets the calculated variable-dispersion-amount setting value to the dispersion compensating unit (S310). Note that the operation of the variable dispersion compensating unit 270 will be explained further below in detail.

Figure 12:
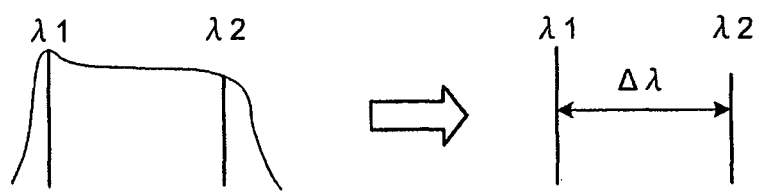
FIG. 12 is a drawing of an operation principle of extracting a wavelength from an optical filter.
Figure 13:
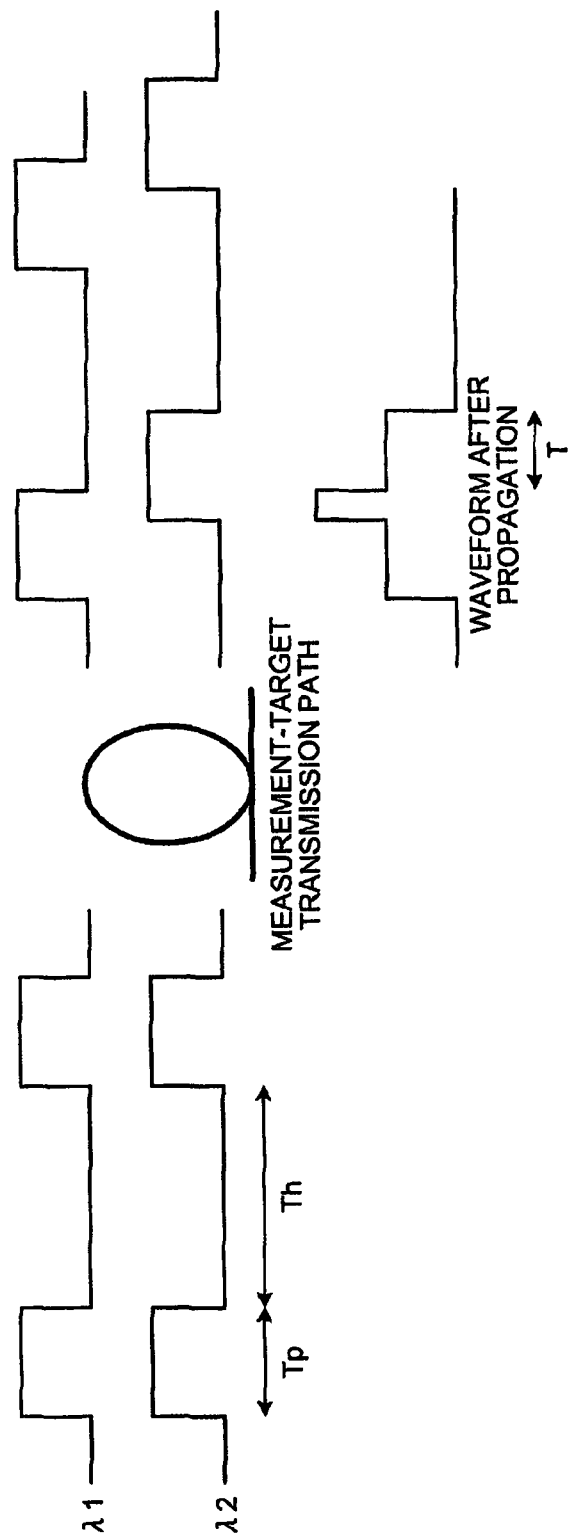
FIG. 13 is a drawing of an operation of measuring a delay time by using the extracted wavelength.
Figure 14:
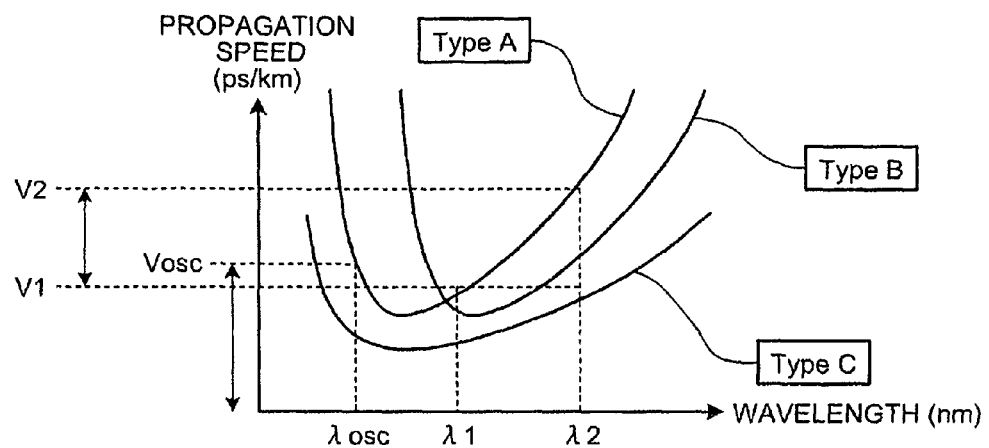
FIG. 14 is a drawing of principles of a fiber-type specifying method.

Next, by using FIGS. 12, 13, and 14, a method of specifying the type of optical-fiber transmission path is explained in detail. First, operation principles of the transmitting unit 100-1 of the transmission-path-type specifying apparatus 10 for extracting wavelengths from the optical filter 104 are explained with reference to FIG. 12. As depicted in the drawing, two different wavelengths (λ1, λ2) included in the plurality of wavelengths are extracted therefrom. Specifically, the ASE light generated by the EDFA 101 has light of a plurality of different wavelength components with a gain bandwidth. When the ASE light enters the optical filter 104, the optical filter 104 extracts light of the different wavelength components λ1 and λ2 from the plurality of wavelength components of the ASE light.

FIG. 13 depicts waveforms immediately before the optical signals of the extracted wavelengths are output to a measurement-target transmission path and a waveform after the optical signals of the wavelengths are transmitted through the measurement-target transmission path.

Specifically, the optical filter 104 of the transmitting unit 100-1 outputs optical signals of two different wavelengths λ1 and λ2 extracted from the ASE light to the optical-fiber transmission path 3, which is a measurement-target transmission path. The receiving unit 220-1 of the facing node 2 then receives the optical signals of the wavelengths λ1 and λ2 transmitted through the optical-fiber transmission path 3. Since the optical signals of the wavelengths λ1 and λ2 are different in wavelength and have different transmission rates at which they are transmitted through the optical-fiber transmission path 3, the times when arriving at the receiving unit 220-1 differ each other, thereby causing a delay time. For this reason, the waveform after propagation of the optical signal arriving at the receiving unit 220-1 is distorted as depicted in a lower-right portion of FIG. 13. Based on this waveform after propagation and the pulse width Tp, the receiving unit 220-1 can measure the delay time T.

Operation principles of specifying the fiber type based on this delay time T and the delay time of the measurement optical signal measured by the OSC delay-time measuring unit 112 are explained with reference to FIG. 14. As depicted in the drawing, FIG. 14 is a graph depicting a propagation speed with respect to the wavelength for each type of the optical-fiber transmission path.

The characteristic value (V) of the optical fiber in the optical-fiber transmission path is, as explained above, a value obtained by dividing the delay time (T) of the wavelength extracted by the optical filter 104 by the delay time (Tosc) of the measurement optical signal measured by the OSC delay-time measuring unit 112. When propagation speeds are taken as V1, V2, and Vosc, with the wavelengths extracted by the optical filter 104 being taken as λ1 and λ2 and the wavelength of the measurement optical signal being taken as λosc, the characteristic value (V) is represented by the following equation:

$$V = T/Tosc = (Vosc/V1 - Vosc/V2)/2 \qquad (2)$$

From Equation (2), the characteristic value V can be calculated from the propagation speeds Vosc, V1, and V2 with respect to the wavelengths λosc, λ1, and λ2. That is, by using the graph of FIG. 14, from the wavelengths λosc, λ1, and λ2, the propagation speeds Vosc, V1, and V2 can be found that are unique to each fiber type. The unique propagation speeds Vosc, V1, and V2 for each fiber type are then substituted in Equation (2), thereby calculating the characteristic value V. Since the characteristic value V is calculated from the propagation speeds Vosc, V1, and V2 different for each fiber type, the characteristic value V is a value unique to each fiber type. If the characteristic values V of a plurality of fiber types coincide with each other, λ1 and λ2 are selected so that the characteristic value V is unique to each fiber type. With this, the type of the optical-fiber transmission path can be specified with the characteristic value V.

Therefore, when the characteristic value V is calculated based on the delay time (T) of the wavelengths extracted by the optical filter 104 and the delay time (Tosc) of the measurement optical signal measured by the OSC delay-time measuring unit 112, the type of the optical-fiber transmission path can be easily specified even without calculating the dispersion amount per unit length of the optical-fiber transmission path. Also, even if the dispersion amounts per unit length of a plurality of optical-fiber transmission paths coincide with each other, the type of the optical-fiber transmission path can be reliably distinguished with the characteristic value V. Furthermore, once the type of the optical-fiber transmission path is specified, the optical-output-power limit value output to the optical-fiber transmission path is specified. With this, optical output power is controlled with the specified optical-output-power limit value thereby suppressing distortion of the transmission waveform due to a non-linear effect.

When the fiber type is specified in the manner explained above, the optical output power output to the specified optical-fiber transmission path can be corrected. Next, a method of correcting the optical output power output to the optical-fiber transmission path is explained with reference to FIGS. 15 and 16. Note in FIGS. 15 and 16 that a plurality of nodes are connected to each other via an optical-fiber transmission path, and a distance between nodes is hereinafter referred to as a span.

Figure 15:
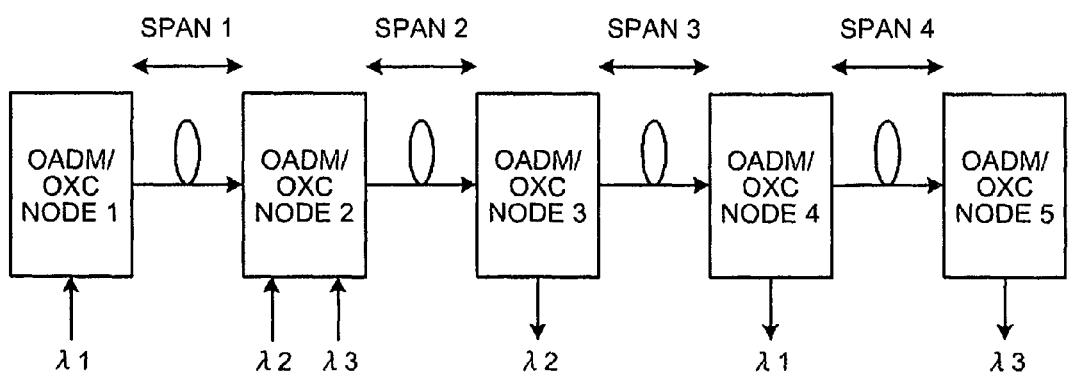
FIG. 15 is a drawing of an example of an output-power correcting method.

In FIG. 15, a target value P of the optical output power output from each node to the optical-fiber transmission path is calculated from the following equation with the number of propagation spans S of the wavelength transmitted through the optical-fiber transmission path, where Px represents a limit value of the optical output power of the optical-fiber transmission path whose type has been specified, and k represents an arbitrary constant:

$$P = Px - k \times 10 \log S \quad (3)$$

Specifically, in a span 2, optical signals of wavelengths λ1, λ2, and λ3 are transmitted. The number of propagation spans for the wavelength λ1 is 3 because a transmission is made through a span 1, a span 2, and a span 3. Similarly, the number of propagation spans is 1 for the wavelength λ2 and 3 for the λ3. Therefore, the target value P of the optical output power output of the span 2 to the optical-fiber transmission path is a value obtained by substituting 3 into the number of propagation spans S.

As such, as the number of spans for wavelength transmission increases, the target value of the optical output power output to the optical-fiber transmission path decreases, thereby suppressing an increase of a non-linear effect by increasing the distance for wavelength transmission. Thus, the transmission-path-type specifying apparatus 10 of each node can output appropriate optical output power.

Figure 16:
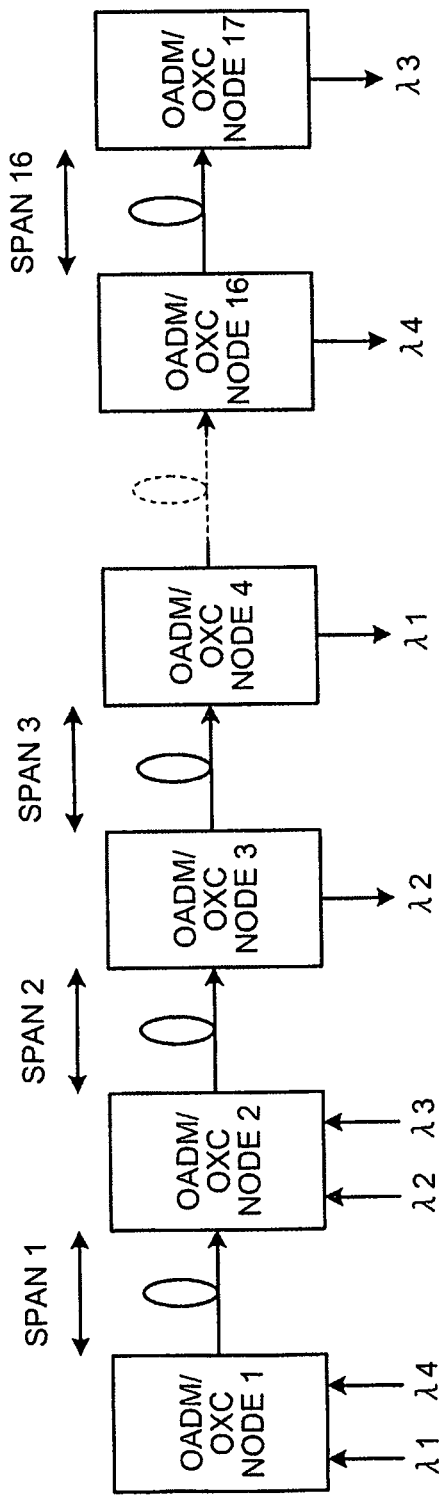
FIG. 16 is a drawing of another example of the output-power correcting method.

In FIG. 16, the target value P of the optical output power output from each node to the optical-fiber transmission path is calculated based on a maximum number of spans in the network by using Equation (3). Specifically, as depicted in the drawing, in a network where nodes 1 to 17 are connected, the number of waveform propagation spans is 16 at maximum. Therefore, the target value P of the optical output power output from all nodes to the optical-fiber transmission path is a value obtained by substituting 16 into the number of propagation spans S.

In this manner, the transmission-path-type specifying apparatus 10 of each node can correct the optical output power based on the maximum number of spans in the network. Therefore, even if the waveform structure is arbitrarily changed within the maximum number of spans, appropriate optical output power can be output without changing it. In particular, the method in FIG. 16 is effective for a network where the number of wavelengths for use is frequently increased and decreased.

Also, when the fiber type is specified, the dispersion amount of the wavelengths for transmission through the specified optical-fiber transmission path can be adjusted. Thus, the configuration of controlling the dispersion amount of wavelengths for transmission through the optical-fiber fiber transmission path whose type has been specified is next with reference to FIGS. 17 and 18. Note that variable dispersion compensating units 270 and 280 depicted in FIGS. 17 and 18 may be added to the receiving unit 220-1 of the optical transmission system (FIG. 2).

Figure 17:
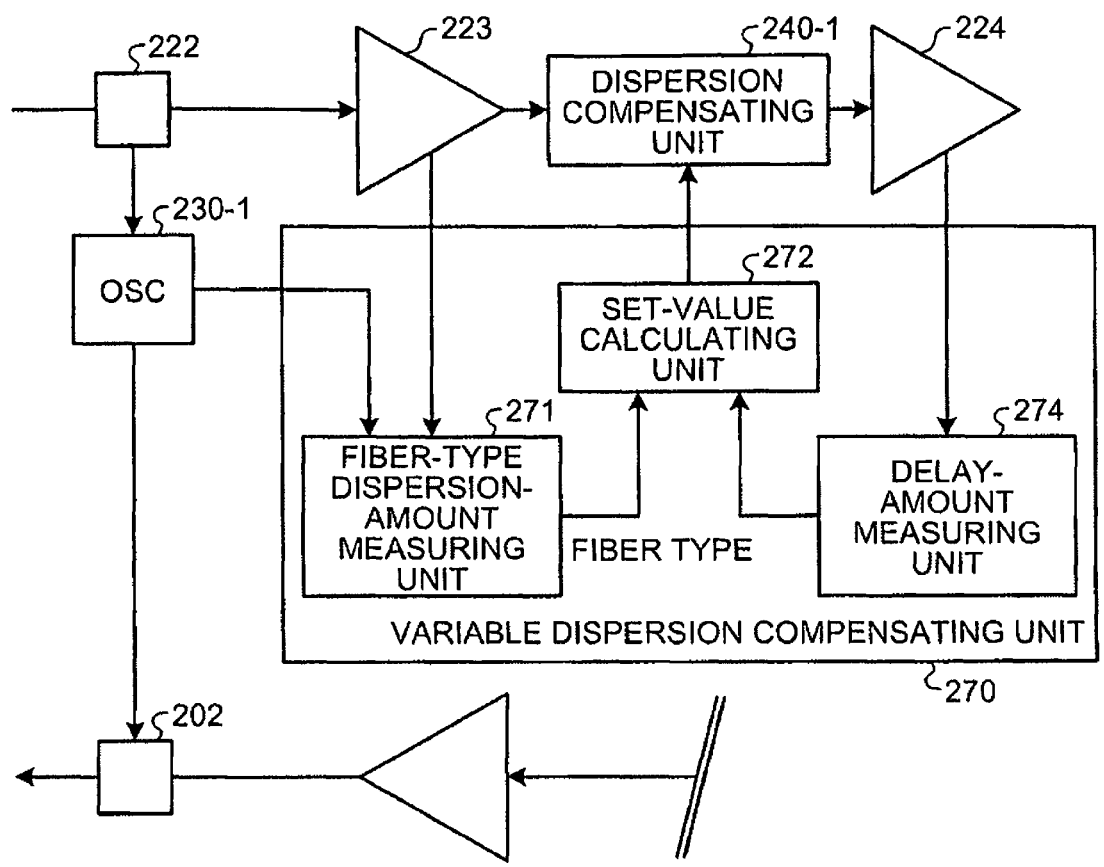
FIG. 17 is a drawing of the configuration of controlling a dispersion compensating unit.

FIG. 17 is a drawing of the configuration of controlling a dispersion compensating unit 240-1. As depicted in the drawing, the dispersion compensating unit 240-1 is disposed between the EDFA 223 and an EDFA 224, and is connected to the variable dispersion compensating unit 270. Also, the variable dispersion compensating unit 270 includes a fiber-type dispersion-amount measuring unit 271 and a set-value calculating unit 272, and a delay-amount measuring unit 274.

The fiber-type dispersion-amount measuring unit 271 obtains an optical signal of wavelength for transmission through the fiber transmission path, the optical signal being amplified by the EDFA 223, to measure the dispersion amount of a transmission wavelength (λs). Also, the fiber-type dispersion-amount measuring unit 271 obtains the specified fiber type from the OSC 230-1 for output to the set-value calculating unit 272.

Figure 27:
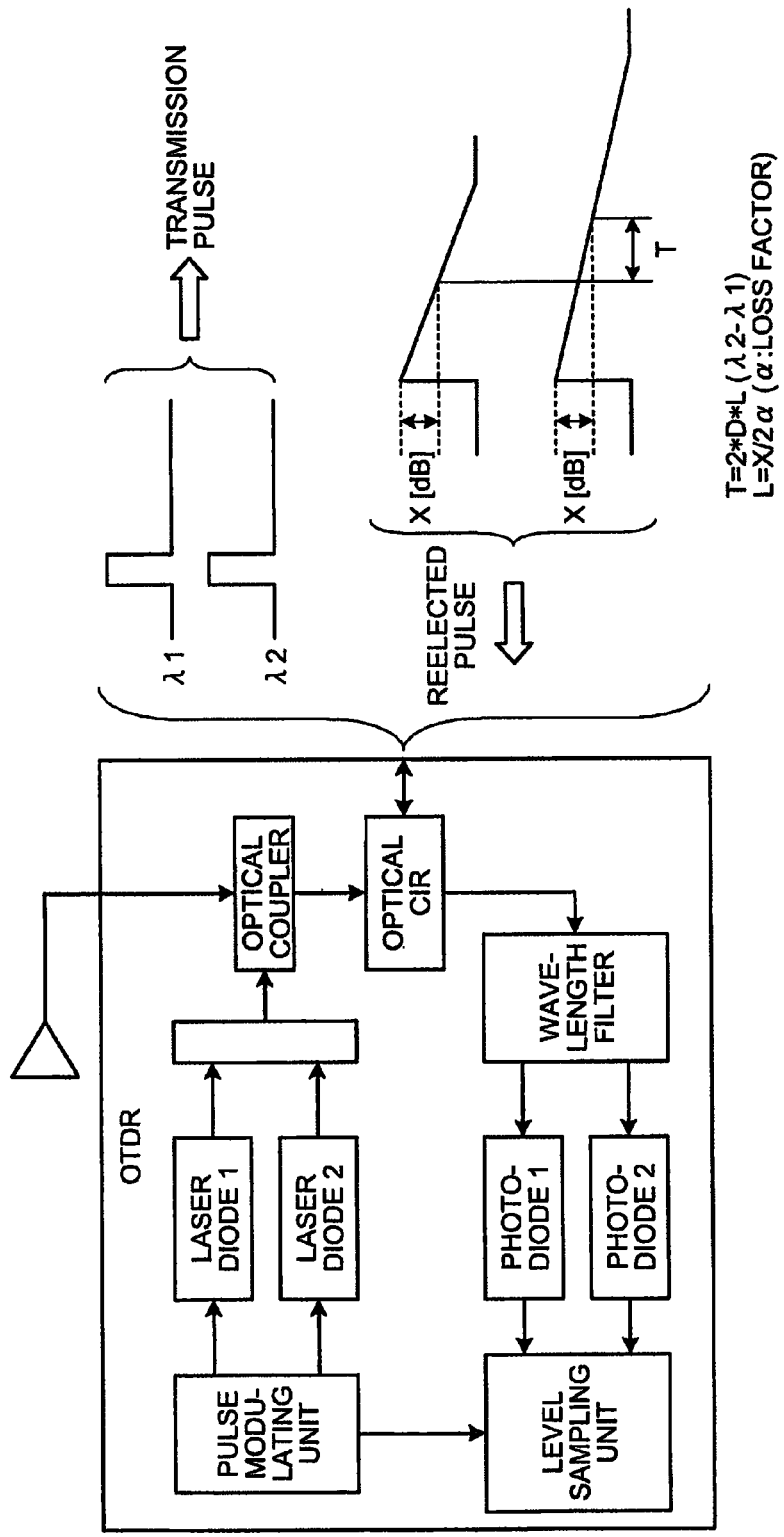
FIG. 27 is a drawing of a conventional method of specifying the type of optical fiber.

The set-value calculating unit 272 calculates an inclination (refer to FIG. 27) corresponding to the fiber type based on the fiber type obtained from the fiber-type dispersion-amount measuring unit 271 for output to the dispersion compensating unit 240-1.

The dispersion compensating unit 240-1 sets the inclination obtained from the set-value calculating unit 272 to the inclination of dispersion. Based on the set inclination of dispersion, the dispersion compensating unit 240-1 then compensates for the dispersion amount of the wavelength (λs) for transmission through the fiber transmission path.

After the wavelength dispersion amount is compensated, the delay-amount measuring unit 274 obtains the optical signals amplified by the EDFA 224 to measure a delay amount. When the delay amount is not 0, the delay-amount measuring unit 274 outputs the delay amount further to the set-value calculating unit 272. In this manner, the variable dispersion compensating unit 270 can compensate for the dispersion amount so that the delay amount is 0.

Figure 18:
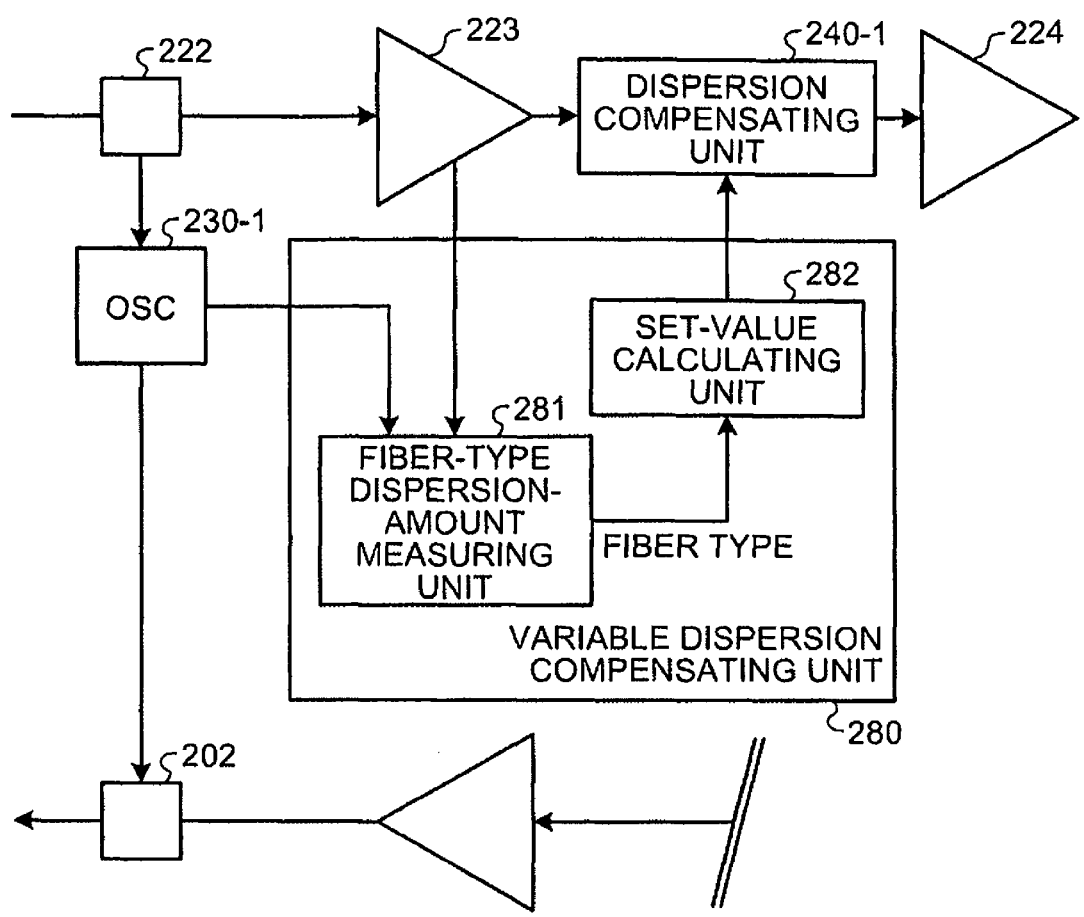
FIG. 18 is a drawing of another configuration of controlling the dispersion compensating unit.

FIG. 18 is a drawing depicting another configuration of controlling the dispersion compensating unit 240-1. As depicted in the drawing, the dispersion compensating unit 240-1 is disposed between the EDFA 223 and the EDFA 224, and is connected to the variable dispersion compensating unit 280. The variable dispersion compensating unit 280 includes a fiber-type dispersion-amount measuring unit 281 and a set-value calculating unit 282.

The fiber-type dispersion-amount measuring unit 281 obtains optical signals of two different wavelength components (λ1, λ2) for transmission through the fiber transmission path, the optical signals being amplified by the EDFA 223, to measure a dispersion amount Z(λc) of an average wavelength (λc) between these two different wavelength components (λ1, λ2). Here, the fiber-type dispersion-amount measuring unit 281 may be used as the dispersion-amount calculating unit 253. In this case, the fiber-type dispersion-amount measuring unit 281 obtains the specified fiber type from the OSC 230-1, and then outputs the fiber type together with the measured dispersion amount Z(λc) to the set-value calculating unit 282.

The set-value calculating unit 282 calculates an inclination (refer to FIG. 27) corresponding to the fiber type output from the fiber-type dispersion-amount measuring unit 281. Also, based on the calculated inclination and the output dispersion amount Z(λc), the set-value calculating unit 282 calculates a dispersion amount from the following equation:

$$Z = a \times Z(\lambda c) \quad (4)$$

The set-value calculating unit 282 then outputs the calculated dispersion amount and inclination to the dispersion compensating unit 240-1.

The dispersion compensating unit 240-1 obtains the inclination and a variable dispersion amount Z from the set-value calculating unit 282, and sets the inclination to the inclination of dispersion and the variable dispersion amount Z to the compensation value of the dispersion amount to compensate for the dispersion amount.

Meanwhile, the network of the optical transmission system including an optical relaying station and terminal stations as components is designed for in-service upgrading in consideration of expansion of the network from the initial configuration at the time of initial setup. Thus, in FIGS. 19, 20, and 21, the configuration designed for in-service upgrading of the optical transmission system is explained.

Figure 19:
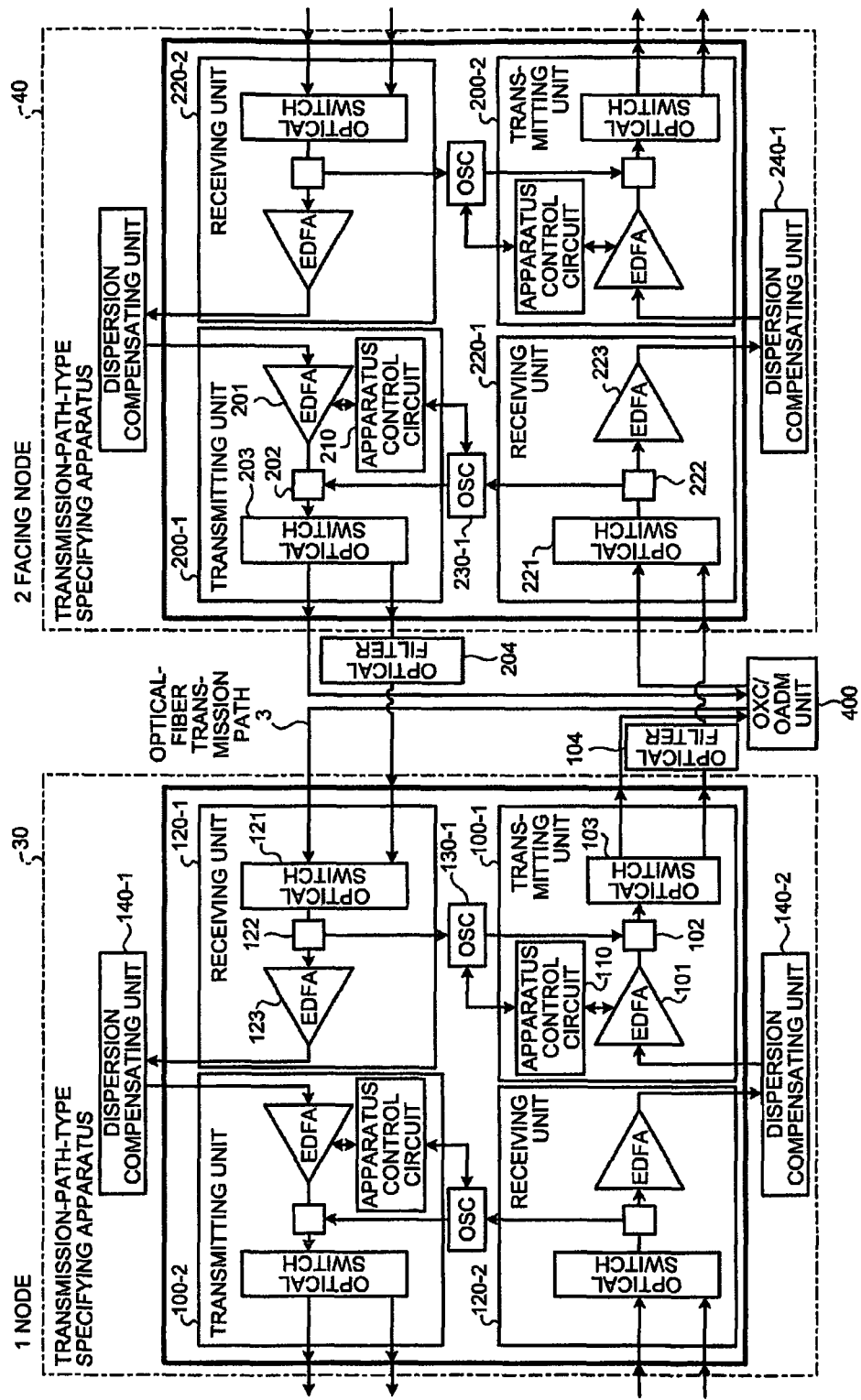
FIG. 19 is a drawing of an OXC or OADM configuration of the optical transmission system according to the first embodiment.

FIG. 19 is a drawing of the configuration of the optical transmission system according to the first embodiment including an OXC/OADM unit. As depicted in the drawing, in FIG. 19, an OXC/OADM unit 400 is added to the configuration of the optical transmission system according to the first embodiment (FIG. 2), and also an optical switch 121 is added to the receiving unit 120-1 and an optical switch 221 is added to the receiving unit 220-1. Furthermore, the optical filters 104 and 204 are deleted from the transmitting unit, and are implemented into the optical-fiber transmission path 3 of the transmitting unit. Note that the functions in FIG. 19 other than those of the OXC/OADM unit 400, the optical switches 121 and 221, and the optical filters 104 and 204 are similar to those in FIG. 2, and therefore are not explained herein.

The OXC/OADM unit 400 is an optical switching station or a branching and multiplexing device, and branches an optical signal in consideration of expansion of the network from the initial configuration of the optical transmission system at the time of initial setup. Specifically, OXC/OADM unit 400 is connected to the transmitting unit 100-1 and the receiving unit 120-1 of the node 1, and is also connected to a transmitting unit 200-1 and the receiving unit 220-1 of the facing node 2.

The optical switches 121 and 221 are switches that switch the route of the optical signal without converting the optical signal. Specifically, the optical switch 121 makes a switch when an optical signal is directly received from the facing node 2 and when an optical signal is received via the OXC/OADM unit 400. The optical switch 221 makes a switch when an optical signal is received from the node 1 and when an optical signal is received via the OXC/OADM unit 400. Here, the optical switch 221 of the receiving unit 220-1 may be a wavelength combiner, and the optical switch 103 of the transmitting unit 100-1 may be a branching unit.

The optical filters 104 and 204 extract light of two different wavelength components from the ASE light passing through the optical switches 103 and 204, and output optical signals of the extracted wavelength components via the optical-fiber transmission path 3 to the facing node 2. At the time of startup before operation of the optical transmission system, the optical filters 104 and 204 are implemented in the optical-fiber transmission path 3 directly connecting the node 1 and the facing node 2 together. As explained above, a transmission-path-type specifying apparatus 30 specifies the optical-fiber type of the optical-fiber transmission path 3 from the optical signals of the wavelength components extracted by the optical filter 104. Although it is assumed herein that the optical filters 104 and 204 are implemented in the optical-fiber transmission path 3, they may be placed in the transmitting units 100-1 and 200-1, respectively.

As such, by using the configuration including the OXC/OADM unit 400, the optical transmission system can use the optical switches (104, 121, 204, 221) inherently included in the OXC/OADM unit 400 required for achieving an in-service upgrading function. Therefore, cost for specifying the type of the optical-fiber transmission path 3 can be suppressed.

Figure 20:
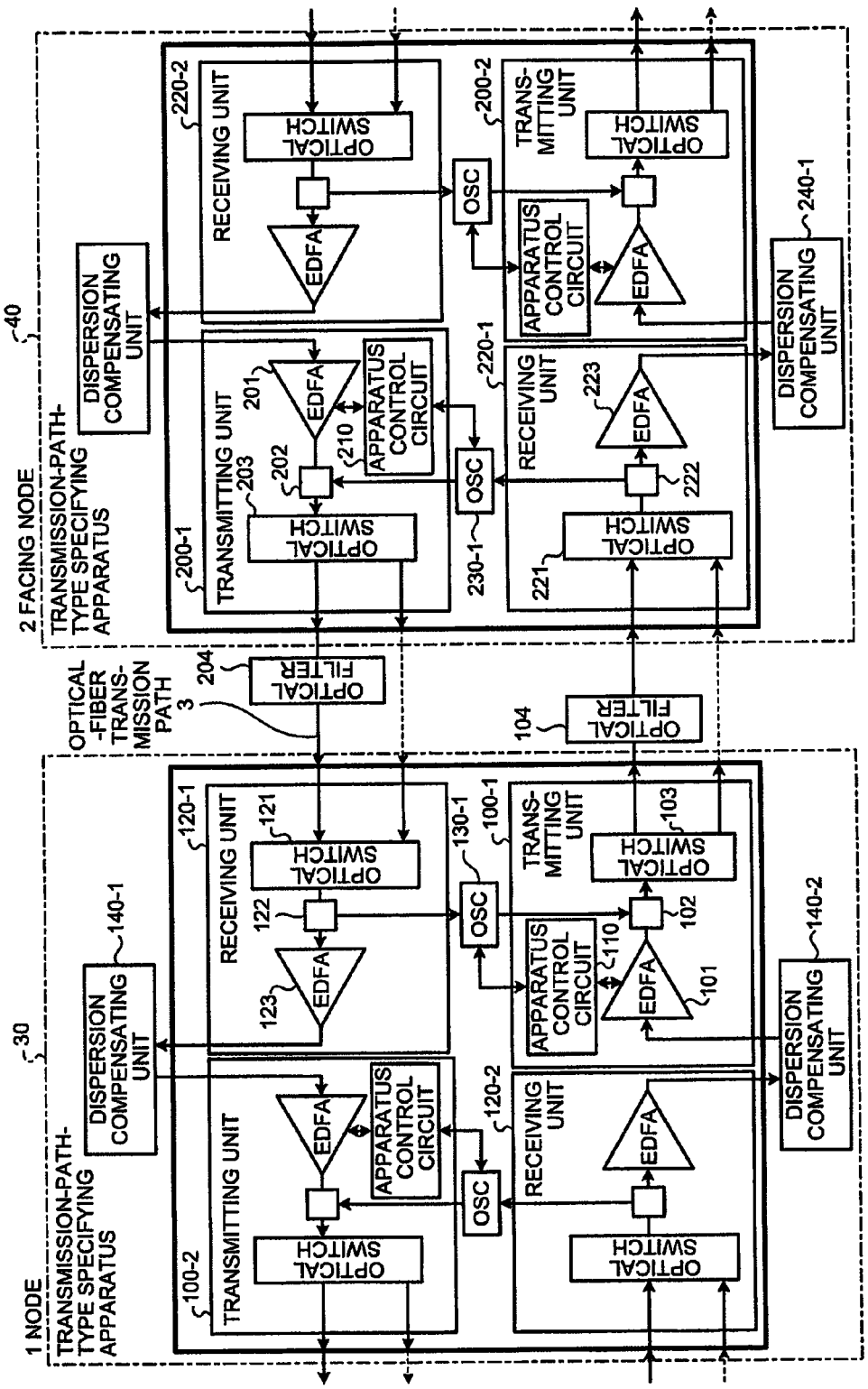
FIG. 20 is a drawing of the configuration of a light relaying station of the optical transmission system according to the first embodiment.

Furthermore, FIG. 20 depicts the configuration of the light relaying station in the optical transmission system using the configuration including the OXC/OADM unit 400 of the optical transmission system. As depicted in the drawing, the optical filter 104 is implemented in either one of two optical-fiber transmission paths 3 connecting the transmitting unit 100-1 of the node 1 and the receiving unit 220-1 of the facing node 2. At this time, the optical switches 103 and 221 make a switch so as to allow communication with the optical-fiber transmission path 3 having the optical filter 104 implemented therein.

Figure 21:
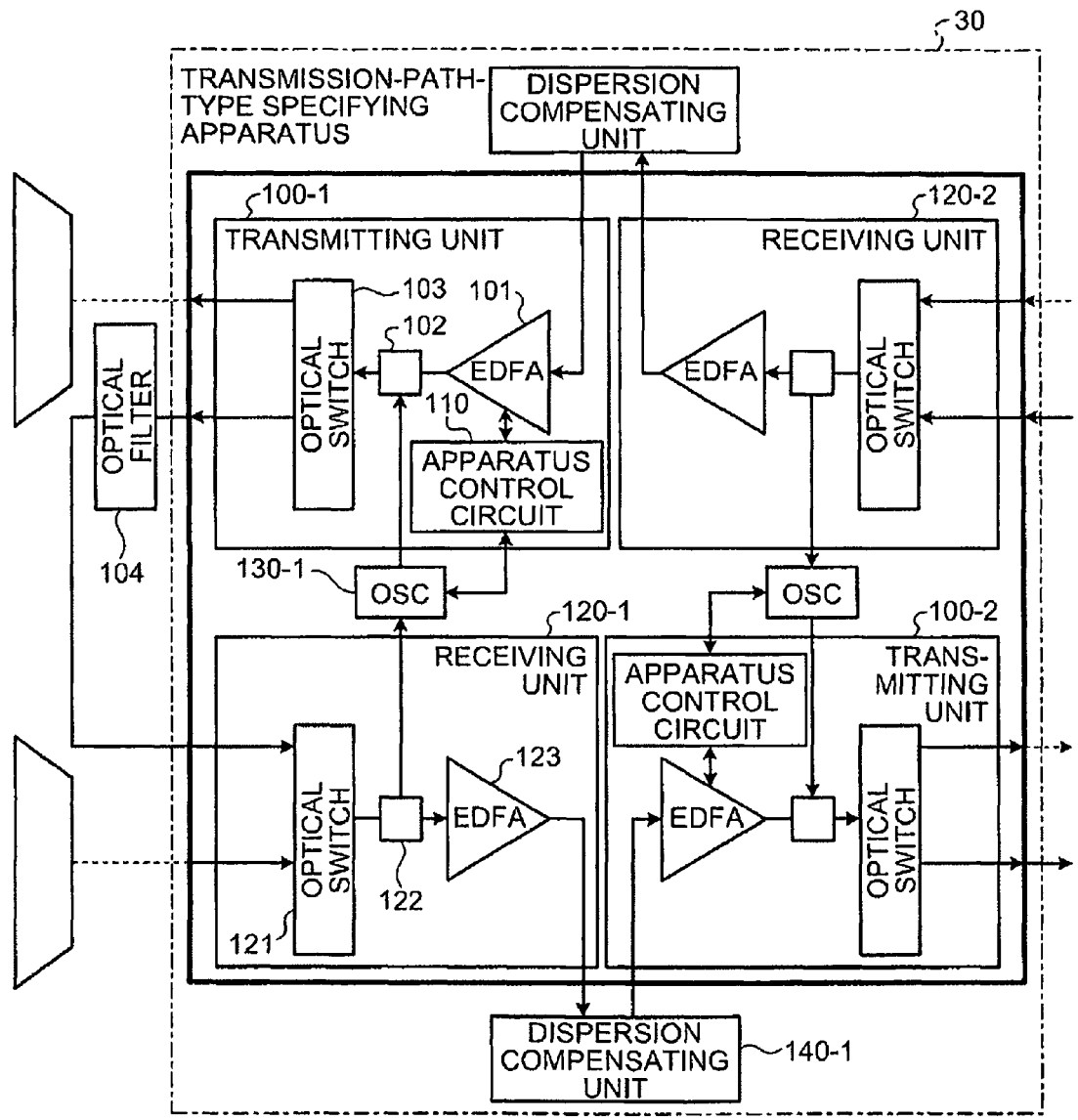
FIG. 21 is a drawing of the configuration of a terminal station of the optical transmission system according to the first embodiment.

Furthermore, FIG. 21 depicts the configuration of the terminal station in the optical transmission system using the configuration including the OXC/OADM unit of the optical transmission system. As depicted in the drawing, the transmitting unit 100-1 of the transmission-path-type specifying apparatus 30 is connected to a terminating device and the receiving unit 120-1 of the transmission-path-type specifying apparatus 30 via the optical-fiber transmission paths 3. The optical filter 104 is implemented in one of two optical-fiber transmission paths 3 connected from the transmitting unit 100-1 that is connected to the receiving unit 120-1 of the transmission-path-type specifying apparatus 30. Here, the optical switches 103 and 121 make a switch so as to allow communication with the optical-fiber transmission path 3 having the optical filter 104 implemented therein.

As such, by using the configuration including the OXC/OADM unit 400, the optical transmission system can use the optical switches (104, 121, 204, 221) inherently included in the OXC/OADM unit 400 required for achieving an in-service upgrading function. Therefore, cost for specifying the type of the optical-fiber transmission path 3 can be suppressed.

As explained above, according to the first embodiment, the transmission-path-type specifying apparatus 10 extracts a plurality of different wavelength components from the light generated by the EDFA 101, simultaneously transmits the same pulse signals superposed on light of the extracted plurality of wavelength components, obtains a delay-time difference between the transmitted pulse signals when arriving at the facing node 2 via the optical-fiber transmission path 3, calculates a characteristic value of the transmission path corresponding to the obtained delay-time difference and the reference time varied depending on the type of the optical-fiber transmission path, and specifies the type of the optical-fiber transmission path 3 based on the calculated characteristic value.

In this manner, the transmission-path-type specifying apparatus 10 extracts a plurality of different wavelengths from the light generated by the EDFA 101, and transmits pulse signals superposed on light of the extracted wavelengths to the optical-fiber transmission path 3, thereby specifying the type of transmission path. Therefore, the EDFA 101 for use in optical transmission at the time of normal operation can also be used for specifying the type of the optical-fiber transmission path 3 at the time of startup, thereby suppressing cost for specifying the type of the optical-fiber transmission path 3. That is, since a laser diode (101a, 101c) serving as a wavelength light source for amplifying light in the EDFA 101 is expensive, the EDFA 101 provided for optical transmission is shared to eliminate a laser diode, thereby suppressing cost. Also, in the transmission-path-type specifying apparatus 10, a characteristic value of the optical-fiber transmission path 3 is calculated from the delay-time difference between pulse signals superposed onto light of the extracted plurality of wavelengths in the optical-fiber transmission path 3, and the type of the optical-fiber transmission path 3 is specified based on the calculated characteristic value. Therefore, if a plurality of wavelengths are selected so that each characteristic value is varied depending on the type of the optical-fiber transmission path 3, the characteristic value is represented uniquely to the transmission path. With this, the type of the optical-fiber transmission path 3 can be correctly specified.

Second Embodiment

Meanwhile, the case is explained in the first embodiment in which the ASE light generated by the EDFA 101 is intensity-modulated by the EDFA 101. This is not meant to restrict the present invention. Alternatively, the ASE light may be intensity-modulated by the EDFA 101 and may be further intensity-modulated by a component other than the EDFA 101.

Figure 22:
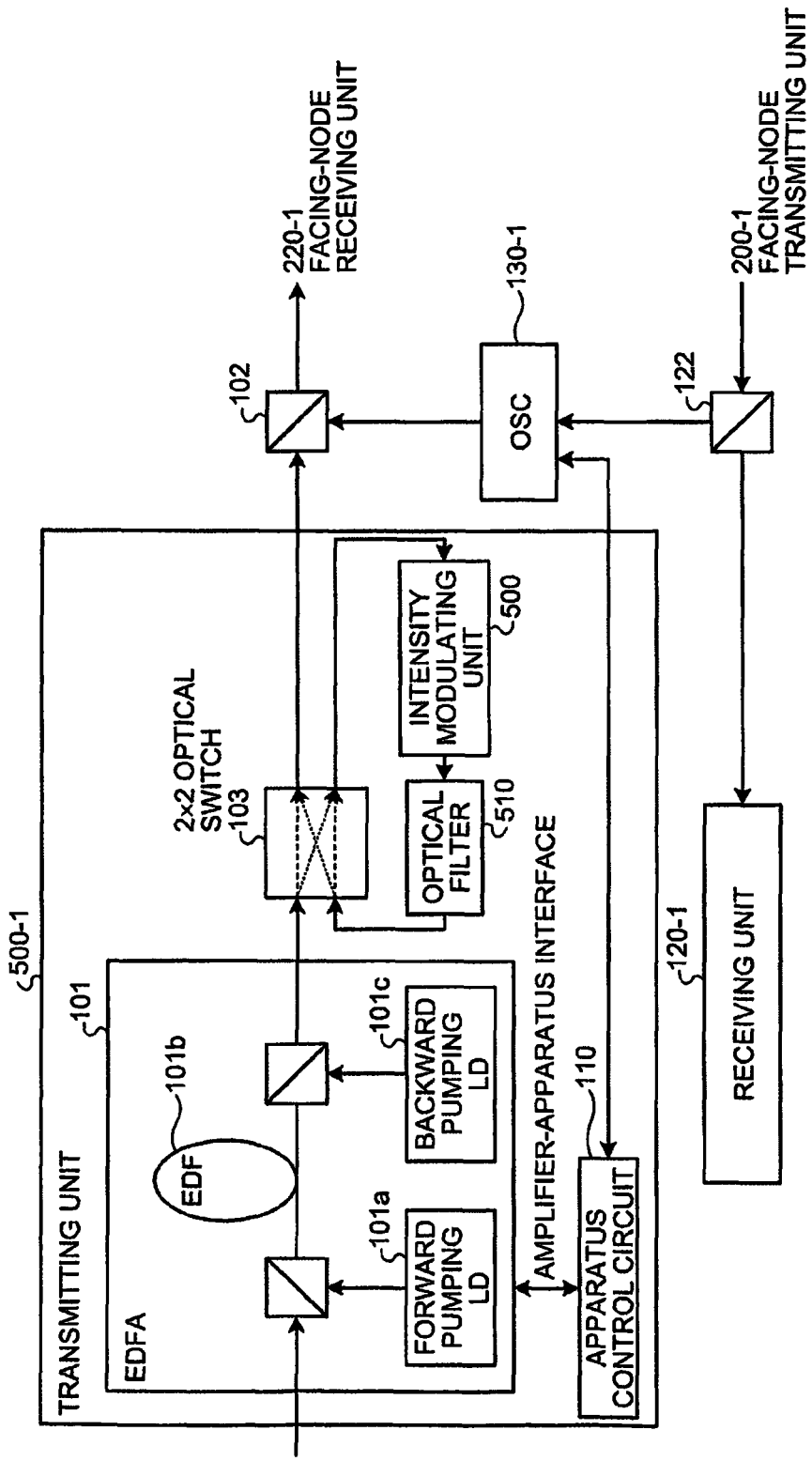
FIG. 22 is a functional block diagram depicting the configuration of a transmitting unit of a transmission-path-type specifying apparatus according to a second embodiment.

In the following second embodiment, as a case where the ASE light is intensity-modulated by a component other than the EDFA 101, the configuration of a transmitting unit of the transmission-path-type specifying apparatus 10 according to a second embodiment is explained by using FIG. 22. FIG. 22 is a diagram depicting the configuration of the transmitting unit of the transmission-path-type specifying apparatus 10 according to the second embodiment. As depicted in the drawing, in the transmission-path-type specifying apparatus 10 according to the second embodiment, an intensity modulating unit 500 is added to the transmission-path-type specifying apparatus 10 according to the first embodiment (FIG. 3). The functions in FIG. 22 other than that of the intensity modulating unit 500 are similar to those in FIG. 3, and therefore are briefly explained.

First, the EDFA 101 generates ASE light, and amplifies the ASE light for intensity modulation, thereby generating optical signals for respective wavelengths. The 2×2 optical switch 103 then switches the route so that the ASE light generated by the EDFA 101 is output to an optical filter 510.

The intensity modulating unit 500 increases the intensity of the ASE light passing through the 2×2 optical switch 103 by increasing the modulation speed, thereby superposing a pulse signal onto the ASE light. Here, the intensity modulating unit 500 may be a VOA or an LN intensity modulator.

The optical filter 510 extracts light of two different wavelength components from the ASE light intensity-modulated by the intensity modulating unit 500, and outputs optical signals of the extracted wavelength components via the optical-fiber transmission path 3 to the receiving unit 220-1 of the facing node 2.

The apparatus control circuit 110 obtains from the OSC 130-1 a delay-time difference between the optical signals of two wavelength components output from the optical filter 104 when arriving at the facing node 2 via the optical-fiber transmission path 3. Also, the apparatus control circuit 110 obtains from the OSC 130-1 a time required for a measurement optical signal transmitted through the optical-fiber transmission path 3 measured by the OSC 130-1 for going from the node 1 to the facing node 2 and returning therefrom. The apparatus control circuit 110 then divides the delay-time difference by the time required for going and returning to calculate a characteristic value of the optical fiber in the optical-fiber transmission path 3.

The apparatus control circuit 110 then specifies the type of the optical-fiber transmission path 3 from the calculated characteristic value.

In this manner, in the transmission-path-type specifying apparatus 10, since the modulation speed is increased by the intensity modulating unit 500, a response in a relieving time of the pulse signals superposed on the ASE light is made quickly. This causes the shape of the pulse signals from a rounded shape to a rectangular shape, thereby allowing a correct measurement of the delay time. In particular, the transmission-path-type specifying apparatus 10 uses the EDFA 101 to intensity-modulate the ASE light. In the EDFA 101, a response in a relieving time of pumping erbium ions is varied depending on whether the wavelength is 0.98 micrometers or 1.48 micrometers of the pump light irradiated to erubium ions. When a wavelength with a slow response in the relieving time is used, intensity modulation can be reliably made.

As explained above, according to the second embodiment, the transmission-path-type specifying apparatus 10 performs modulation so that the shape of the pulse signals superposed on the light generated by the EDFA 101 is rectangular, extracts a plurality of different wavelength components from the modulated light, simultaneously transmits the same pulse signals superposed on light of the extracted plurality of wavelength components, obtains a delay-time difference between the transmitted pulse signals when arriving at the facing node 2 via the optical-fiber transmission path 3, calculates a characteristic value of the transmission path corresponding to the obtained delay-time difference and the reference time varied depending on the type of the optical-fiber transmission path, and specifies the type of the optical-fiber transmission path 3 based on the calculated characteristic value.

In this manner, the transmission-path-type specifying apparatus 10 performs modulation so that the shape of the pulse signals superposed on the light generated by the EDFA 101 is rectangular, thereby allowing a correct measurement of the delay time of light of the extracted plurality of wavelength components.

Third Embodiment

Meanwhile, in the present invention, the ASE light may be intensity-modulated by the EDFA 101 and may be further intensity-modulated and optical-power-output-adjusted by a component other than the EDFA 101.

Figure 23:
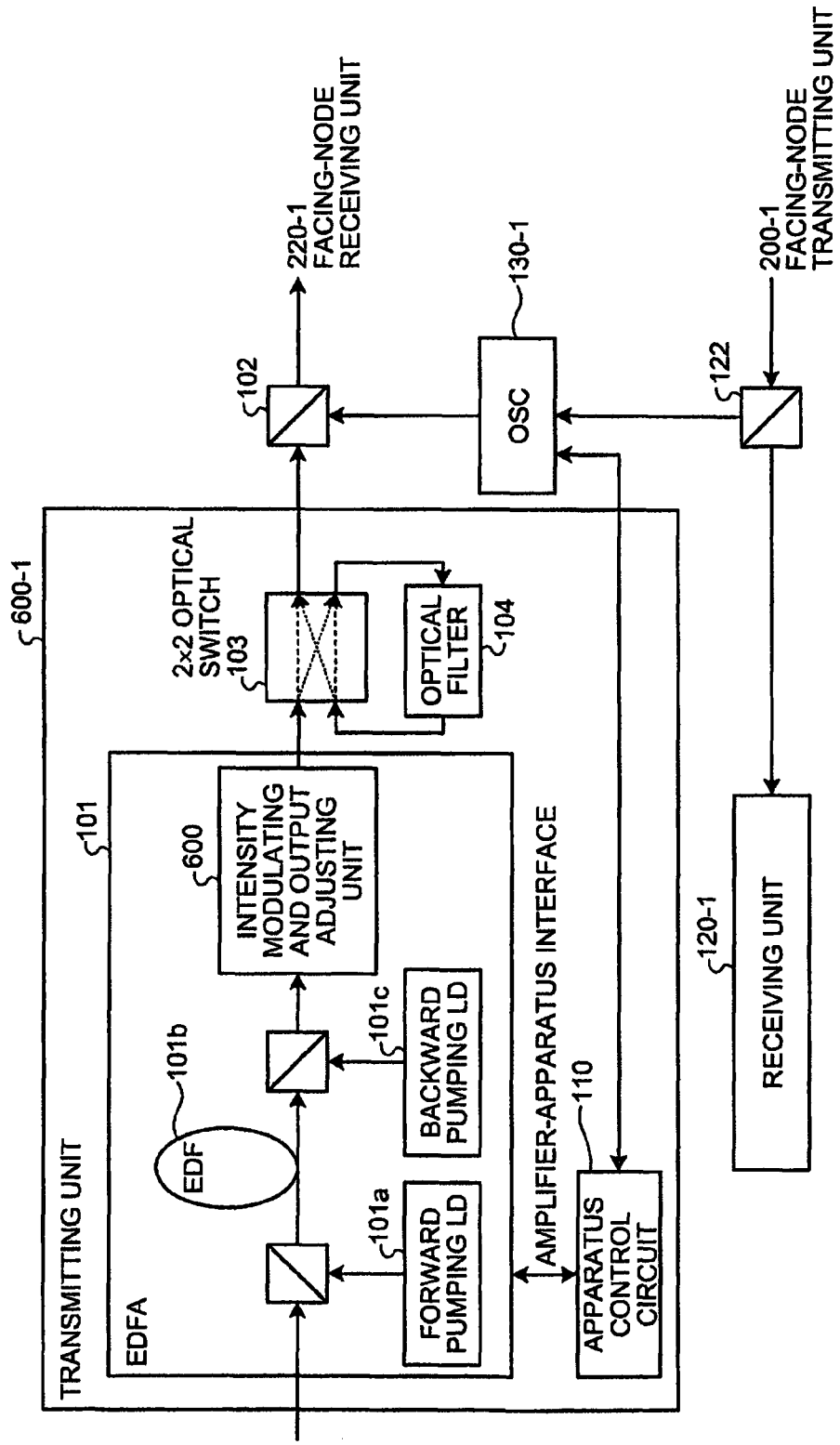
FIG. 23 is a functional block diagram depicting the configuration of a transmitting unit of a transmission-path-type specifying apparatus according to a third embodiment.
Figure 24:
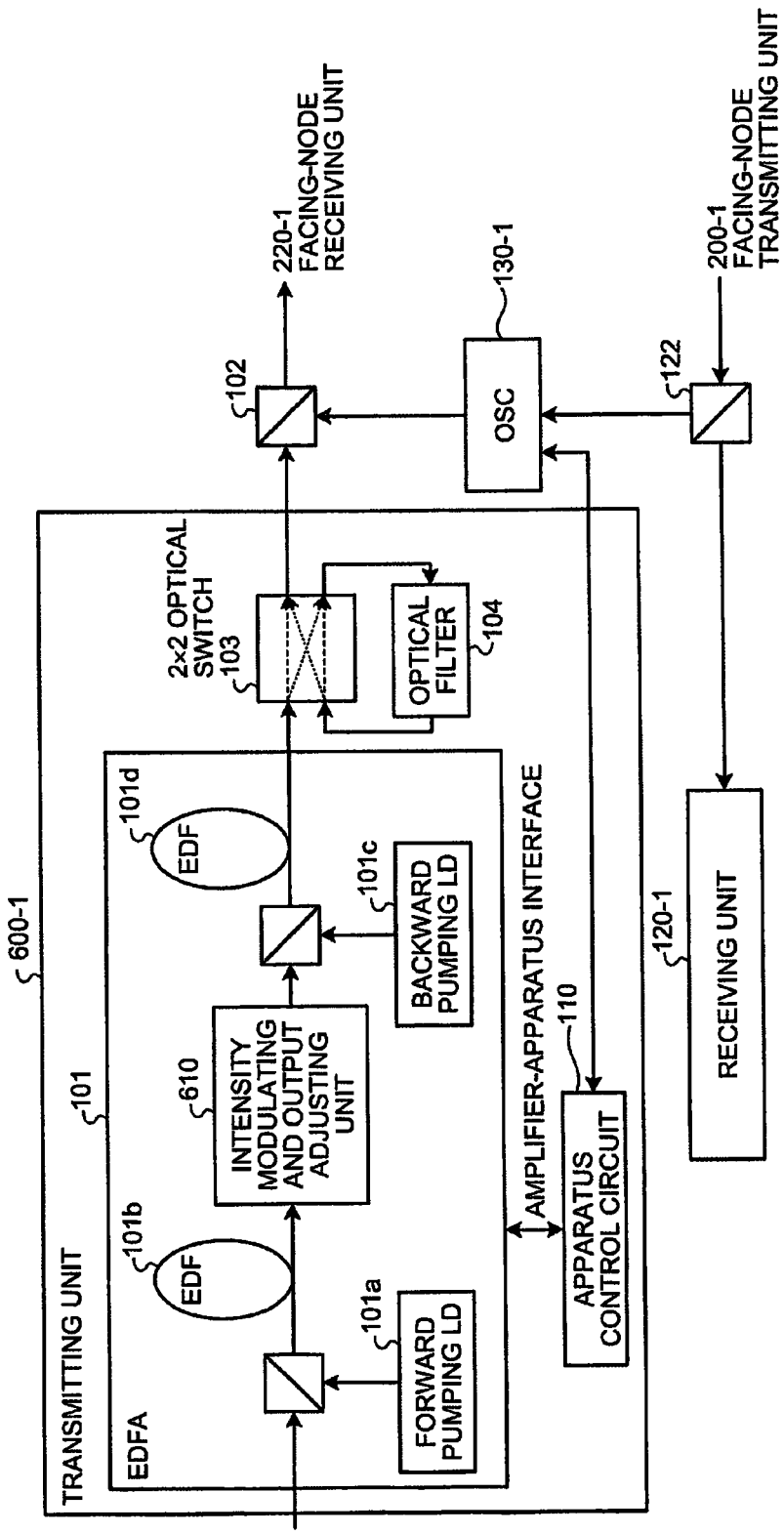
FIG. 24 is a functional block diagram depicting the other configuration of a transmitting unit of a transmission-path-type specifying apparatus according to the third embodiment.

In the following second embodiment, as a case in which the ASE light is intensity-modulated and optical-power-output-adjusted by a component other than the EDFA 101, the configuration of the transmitting unit of the transmission-path-type specifying apparatus 10 according to a third embodiment is explained by using FIG. 23. FIG. 23 is a drawing of the configuration of the transmitting unit of the transmission-path-type specifying apparatus 10 according to the third embodiment. As depicted in the drawing, in the transmission-path-type specifying apparatus 10 according to the third embodiment, an intensity modulating and output adjusting unit 600 is added to the transmission-path-type specifying apparatus 10 according to the first embodiment (FIG. 3). The functions in FIG. 23 other than that of the intensity-modulating and output adjusting unit 600 are similar to those in FIG. 3, and therefore are not explained herein.

The intensity modulating and output adjusting unit 600 is included in the EDFA 101, further increases the modulation speed for the ASE light generated by pumping erbium ions by using both of the forward pumping LD 101a and the backward pumping LD 101c to increase the intensity of the ASE light, thereby superposing pulse signals on the ASE light. Also, the intensity modulating and output adjusting unit 600 appropriately adjusts output power based on the optical-output-power limit value specified with the type of the optical-fiber transmission path 3 specified by the apparatus control circuit 110. Although the intensity modulating and output adjusting unit 600 performs intensity modulation and output adjustment after erbium ions are pumped by the backward pumping LD 101c to generate ASE light, intensity modulation and output adjustment may be performed between the forward pumping LD 101a and the backward pumping LD 101c.

As explained above, according to the third embodiment, the transmission-path-type specifying apparatus 10 performs modulation so that the shape of the pulse signals superposed on the light generated by the EDFA 101 is rectangular, extracts a plurality of different wavelength components from the modulated light, simultaneously transmits the same pulse signals superposed on light of the extracted plurality of wavelength components, obtains a delay-time difference between the transmitted pulse signals when arriving at the facing node 2 via the optical-fiber transmission path 3, calculates a characteristic value of the transmission path corresponding to the obtained delay-time difference and the reference time varied depending on the type of the optical-fiber transmission path 3, and specifies the type of the optical-fiber transmission path 3 based on the calculated characteristic value.

In this manner, the transmission-path-type specifying apparatus 10 performs modulation so that the shape of the pulse signals superposed on the light generated by the EDFA 101 is rectangular, thereby allowing a correct measurement of the delay time of light of the extracted plurality of wavelength components.

Fourth Embodiment

Meanwhile, in the present invention, the ASE light may be intensity-modulated by the EDFA 101 and may be further intensity-modulated for each wavelength by a component other than the EDFA 101.

Figure 25:
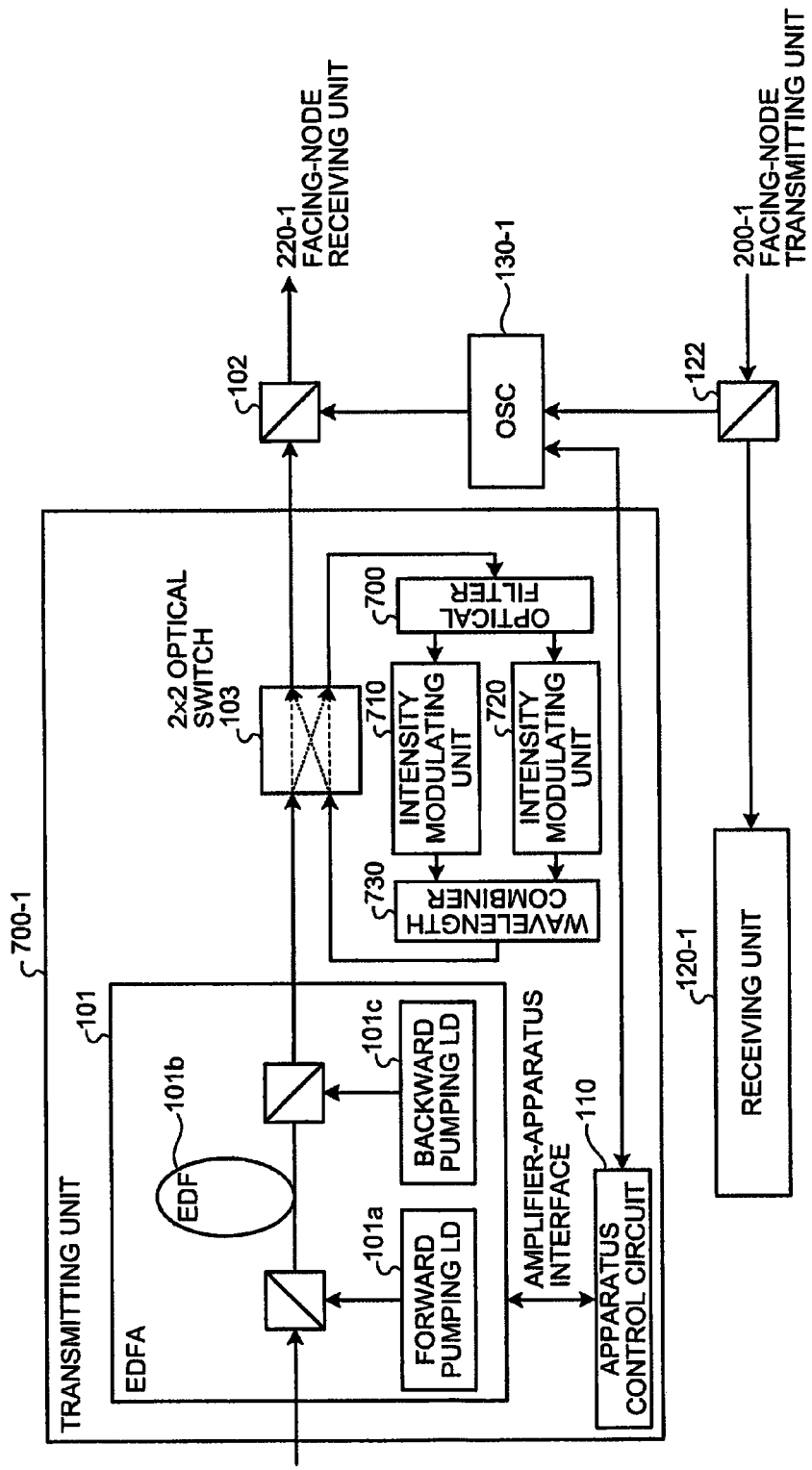
FIG. 25 is a functional block diagram depicting the configuration of a transmitting unit of a transmission-path-type specifying apparatus according to a fourth embodiment.

In the following fourth embodiment, as a case where the ASE light is intensity-modulated for each wavelength by a component other than the EDFA 101, the configuration of a transmitting unit of the transmission-path-type specifying apparatus 10 according to a fourth embodiment is explained by using FIG. 25. FIG. 25 is a drawing of the configuration of the transmitting unit of the transmission-path-type specifying apparatus 10 according to the fourth embodiment. As depicted in the drawing, in the transmission-path-type specifying apparatus 10 according to the fourth embodiment, intensity modulating units 710 and 720 and a wavelength combiner 730 are added to the transmission-path-type specifying apparatus 10 according to the first embodiment (FIG. 3), and an optical filter 700 is changed. The functions in FIG. 25 other than that of the intensity modulating units 710 and 720 and wavelength combiner 730 are similar to those in FIG. 3, and therefore are not explained herein.

First, the EDFA 101 generates ASE light, and amplifies the ASE light for intensity modulation, thereby generating optical signals for respective wavelengths. The 2×2 optical switch 103 then switches the route so that the ASE light generated by the EDFA 101 is output to the optical filter 700.

The optical filter 700 extracts light of two different wavelength components from the ASE light passing through the optical filter 700, and outputs optical signals of the extracted wavelength components to the intensity modulating units 710 and 720 for each wavelength component.

The intensity modulating units 710 and 720 each increase the intensity of the optical signal of the wavelength component output from the optical filter 700 by increasing the modulation speed, thereby output the resulting signal to the wavelength combiner 730. Here, the intensity modulating units 710 and 720 may be VOAs or LN intensity modulators.

The wavelength combiner 730 combines the optical signals of the wavelength components intensity-modulated by the intensity modulating units 710 and 720 for output to the receiving unit 220-1 of the facing node 2 through the optical-fiber transmission path 3.

As explained above, according to the fourth embodiment, the transmission-path-type specifying apparatus 10 extracts a plurality of different wavelength components from the light generated by the EDFA 101, performs modulation so that the shape of the pulse signals superposed on the light of the extracted plurality of wavelength components is rectangular, simultaneously transmits the same pulse signals superposed on the modulated light of the plurality of wavelength components, obtains a delay-time difference between the transmitted pulse signals when arriving at the facing node 2 via the optical-fiber transmission path 3, calculates a characteristic value of the optical fiber in the optical-fiber transmission path 3 from the obtained delay-time difference, and specifies the type of the optical-fiber transmission path 3 based on the calculated characteristic value.

In this manner, the transmission-path-type specifying apparatus 10 modulates the pulse signals superposed on the light of the plurality of wavelength components, thereby allowing outputs with the modulation time being shifted by the delay-time difference in the optical-fiber transmission path 3 of the plurality of wavelength components. With this, the dispersion amount in the optical-fiber transmission path 3 can be adjusted.

Fifth Embodiment

Meanwhile, the case has been explained in the first to fourth embodiments in which light of two different wavelength components is extracted by the optical filter from the ASE light generated by the EDFA 101. However, this is not meant to restrict the present invention. Alternatively, light of two different wavelength components may be extracted by the EDFA 101 from the ASE light.

Figure 26:
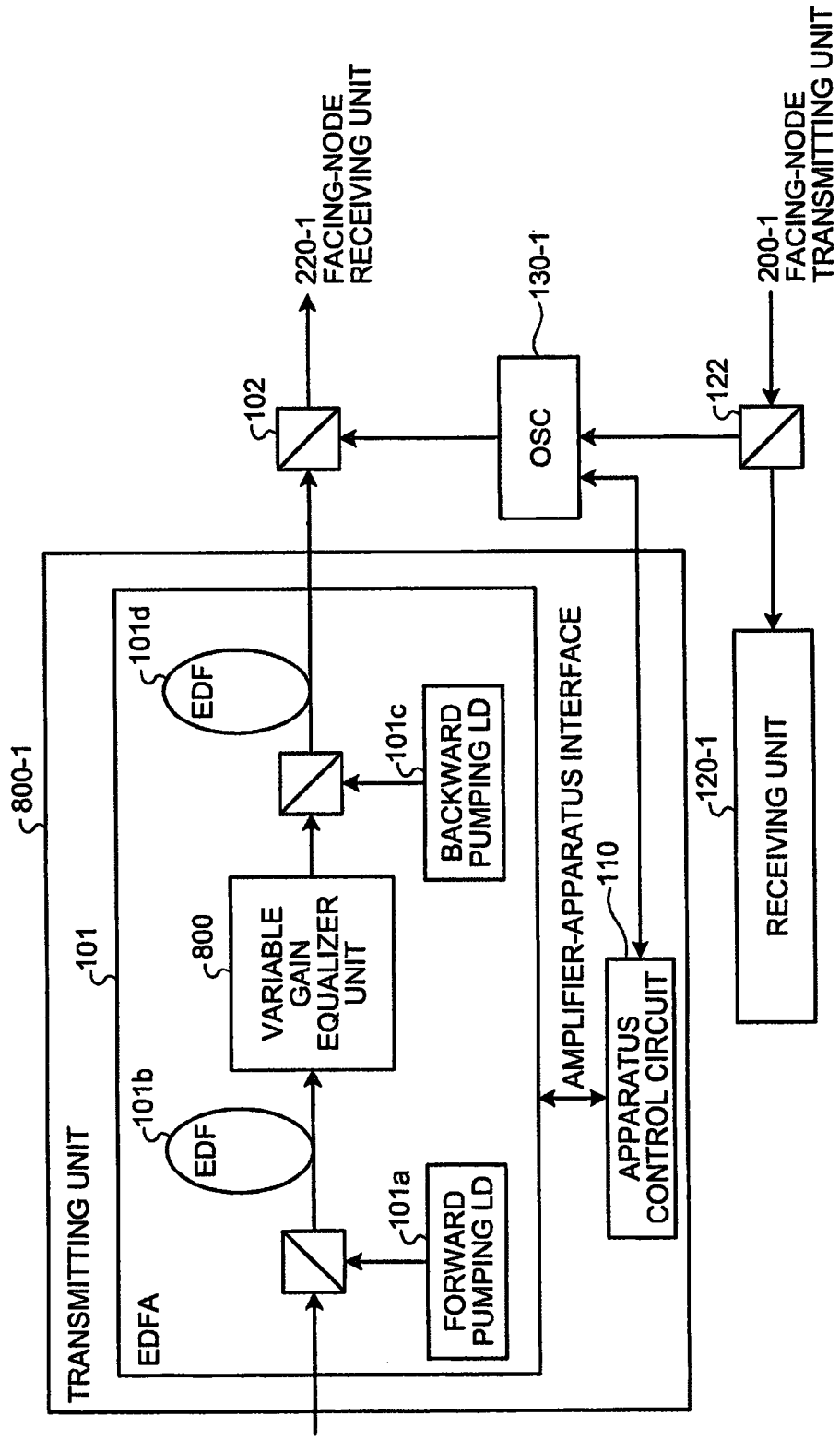
FIG. 26 is a functional block diagram depicting the configuration of a transmitting unit of a transmission-path-type specifying apparatus according to a fifth embodiment.

In the following fifth embodiment, as a case where light of two different wavelength components is extracted by the EDFA 101 from the ASE light, the configuration of a transmitting unit of the transmission-path-type specifying apparatus 10 according to a fifth embodiment is explained by using FIG. 26. FIG. 26 is a drawing of the configuration of the transmitting unit of the transmission-path-type specifying apparatus 10 according to the fifth embodiment. As depicted in the drawing, in the transmission-path-type specifying apparatus 10 according to the fifth embodiment, a variable gain equalizer unit 800 is added to the transmission-path-type specifying apparatus 10 according to the first embodiment (FIG. 3), and the optical switch 103 and the optical filter 104 are deleted therefrom. The functions in FIG. 26 other than that of the variable-gain equalizer unit 800 are similar to those in FIG. 3, and therefore are not explained herein.

The variable gain equalizer unit 800 is provided to the EDFA 101. At the time of start-up before operation as an optical transmission system, light of two different wavelength components is extracted from the ASE light generated by pumping erbium ions with the forward pumping LD 101a, and is subjected to intensity modulation. Also at the time of operation of the optical transmission system, the variable gain equalizer unit 800 amplifies all wavelengths of the ASE light generated by pumping erbium ions with the forward pumping LD 101a.

As explained above, according to the fifth embodiment, the transmission-path-type specifying apparatus 10 includes the variable gain equalizer unit 800 that extracts a plurality of different wavelength components from the light generated by the EDFA 101, simultaneously transmits the same pulse signals superposed on the light of the plurality of wavelength components extracted by the variable gain equalizer unit 800, obtains a delay-time difference between the transmitted pulse signals when arriving at the facing node 2 via the optical-fiber transmission path 3, calculates a characteristic value of the transmission path corresponding to the obtained delay-time difference and the reference time varied depending on the type of the optical-fiber transmission path 3, and specifies the type of the optical-fiber transmission path 3 based on the calculated characteristic value.

In this manner, the transmission-path-type specifying apparatus 10 includes the variable gain equalizer unit 800, thereby extracting a plurality of wavelength components even without including the 2×2 optical switch 103 or the optical filter 104 as depicted in FIG. 3. Therefore, cost for specifying the type of the optical-fiber transmission path 3 by using the extracted wavelength components can be further suppressed.

Note that all or any part of process functions performed in the transmission-path-type specifying apparatus 10 may be achieved by a program analyzed and executed at a Central Processing Unit (CPU) or may be achieved as hardware with a wired logic.

According to the configuration explained above, the transmission-path-type specifying apparatus extracts a plurality of different wavelengths from light including wavelength components occurring at the time of communications and transmits to a transmission path pulse signals superposed on light with the extracted wavelengths, thereby specifying the type of transmission path. Therefore, the optical amplifier for use in optical transmission at the time of normal operation can also be used for specifying the type of transmission path at the time of start-up, thereby suppressing cost for specifying the type of transmission path. That is, since a laser diode serving as a wavelength light source for amplifying light in the optical amplifier is expensive, the optical amplifier provided for optical transmission is shared to eliminate a laser diode, thereby suppressing cost. Also, in the transmission-path-type specifying apparatus, a characteristic value of the transmission path is calculated corresponding to the delay-time difference between pulse signals superposed on light of the extracted plurality of wavelengths and the reference time varied depending on the type of transmission path, and the type of the transmission path is specified based on the calculated characteristic value. Therefore, if a plurality of wavelengths are selected so that each characteristic value is varied depending on the type of transmission path, the characteristic value is represented uniquely to the transmission path. With this, the type of transmission path can be correctly specified.

The transmission-path-type specifying apparatus and method disclosed herein can achieve an effect in which the type of optical fiber for transmitting a wavelength-division-multiplexed (WDM) optical signal can be correctly specified at low cost.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A transmission-path-type specifying apparatus comprising:
    an optical filter that extracts a plurality of different wavelength components from light including wavelength components occurring at the time of communication;
    a transmitter that simultaneously transmits a measurement signal and same pulse signals superposed on light of the wavelength components extracted by the optical filter;
    a modulation controller that obtains a delay-time difference among the pulse signals transmitted by the transmitter when arriving at a destination via a transmission path and a time required for the measurement signal transmitted by the transmitter to go and return through the transmission path via the destination;
    a calculator that calculates, based on the delay-time difference and the time for the measurement signal to go and return obtained by the modulation controller, a characteristic value of the transmission path corresponding to a reference time varied depending on a type of the transmission path;
    a determination circuit that specifies the type of the transmission path based on the characteristic value calculated by the calculator; and
    a dispersion-amount compensation circuit that decreases a dispersion amount of the wavelength components transmitted through the transmission path based on the type of the transmission path specified by the determination circuit.

2. The transmission-path-type specifying apparatus according to claim 1, wherein
    the transmitter transmits the measurement signal using a wavelength component different from the wavelength components, and
    the modulation controller includes a time measurement circuit that measures the time required for the measurement signal transmitted by the transmitter to go and return through the transmission path via the destination, and
    the calculator calculates the characteristic value by dividing the delay-time difference obtained by the modulation controller by the time measured by the time measurement circuit.

3. The transmission-path-type specifying apparatus according to claim 1, wherein
    the optical filter includes an optical switch that makes a switch so that different wavelength components are extracted from light occurring at the time of optical transmission.

4. The transmission-path-type specifying apparatus according to claim 3, wherein
    the optical switch includes a switch placed for in-service upgrade.

5. The transmission-path-type specifying apparatus according to claim 1, wherein
    the optical filter includes a variable optical gain equalizer that extracts different wavelength components from light occurring at the time of optical transmission.

6. The transmission-path-type specifying apparatus according to claim 1, wherein the transmitter includes a modulator that superposes pulse signals on the light of the wavelength components extracted by the optical filter so that a waveform is rectangular, and the transmitter simultaneously transmits the pulse signals modulated by the modulator.

7. The transmission-path-type specifying apparatus according to claim 1, further comprising a cutting-off circuit that cuts off an external optical signal.

8. The transmission-path-type specifying apparatus according to claim 1, further comprising an output correct circuit that corrects output power of an optical signal based on the type of the transmission path specified by the determination circuit.

9. The transmission-path-type specifying apparatus according to claim 8, wherein the output correct circuit corrects the output power of the optical signal based on a limit value of the output power of the optical signal corresponding to the type of the transmission path specified by the determination circuit and a maximum number of spans transmitted with the light of the wavelength components transmitted through the transmission path.

10. The transmission-path-type specifying apparatus according to claim 8, wherein the output correct circuit corrects the output power of the optical signal based on a limit value of the output power of the optical signal corresponding to the type of the transmission path specified by the determination circuit and a maximum number of transmission spans of a network.

11. The transmission-path-type specifying apparatus according to claim 1, wherein the dispersion-amount compensation circuit includes:
a dispersion-amount calculator that calculates a dispersion amount for an average wavelength of the wavelength components in the transmission path based on the delay-time difference; and
a transmission-wavelength dispersion-amount calculator that calculates a wavelength dispersion amount for transmission through the transmission path based on the dispersion amount calculated by the dispersion-amount calculator and the type of the transmission path specified by the determination circuit, and the dispersion-amount compensation circuit decreases the wavelength dispersion amount based on the dispersion amount calculated by the transmission-wavelength dispersion-amount calculator.

12. The transmission-path-type specifying apparatus according to claim 1, wherein the determination circuit includes a transmission-path-type memory that stores the type of the transmission path and the characteristic value as a pair, and
the determination circuit specifies the type of the transmission path based on the transmission-path-type memory and the characteristic value calculated by the calculator.

13. The transmission-path-type specifying apparatus according to claim 2, further comprising a transmission-path-length calculator that calculates a length of the transmission path based on a propagation speed of the measurement signal corresponding to the type of the transmission path specified by the determination circuit and the time for the measurement signal to go and return.

14. A transmission-path-type specifying method comprising:

extracting a plurality of different wavelength components from light including wavelength components occurring at the time of communication;
simultaneously transmitting a measurement signal and same pulse signals superposed on light of the extracted wavelength components;
obtaining a delay-time difference among the transmitted pulse signals when arriving at a destination via a transmission path and a time required for the measurement signal transmitted by the transmitter to go and return through the transmission path via the destination;
calculating, based on the delay-time difference and the time for the measurement signal to go and return obtained at the obtaining, a characteristic value of the transmission path corresponding to a reference time varied depending on a type of the transmission path;
specifying the type of the transmission path based on the calculated characteristic value; and
decreasing a dispersion amount of the wavelength components transmitted through the transmission path based on the type of the transmission path specified at the specifying.

* * * * *